United States Patent
Kato et al.

(10) Patent No.: US 10,389,133 B2
(45) Date of Patent: Aug. 20, 2019

(54) DEVICE AND METHOD FOR CONTROLLING POWER SYSTEM

(71) Applicant: Hitachi, Ltd., Chiyoda-ku, Tokyo (JP)

(72) Inventors: Daichi Kato, Tokyo (JP); Eisuke Kuroda, Tokyo (JP); Osamu Tomobe, Tokyo (JP); Masahiro Yatsu, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/571,172

(22) PCT Filed: Apr. 15, 2016

(86) PCT No.: PCT/JP2016/062049
§ 371 (c)(1),
(2) Date: Nov. 1, 2017

(87) PCT Pub. No.: WO2016/181754
PCT Pub. Date: Nov. 17, 2016

(65) Prior Publication Data
US 2018/0262010 A1    Sep. 13, 2018

(30) Foreign Application Priority Data
May 13, 2015  (JP) .................................. 2015-098566

(51) Int. Cl.
*G05B 19/00* (2006.01)
*H02J 3/38* (2006.01)
*H02J 3/00* (2006.01)
*H02J 3/24* (2006.01)
*H02J 3/28* (2006.01)
*H02J 3/46* (2006.01)

(52) U.S. Cl.
CPC .............. *H02J 3/383* (2013.01); *G05B 19/00* (2013.01); *H02J 3/00* (2013.01); *H02J 3/24* (2013.01);
(Continued)

(58) Field of Classification Search
CPC ........ H02J 3/00; H02J 3/24; H02J 3/28; H02J 3/38; H02J 3/383; H02J 3/386; H02J 3/46
See application file for complete search history.

(56) References Cited

U.S. PATENT DOCUMENTS 8,334,606 B2 * 12/2012 Oohara ................... F03D 7/028
                                                                    290/44
8,963,353 B1    2/2015 Ekanayake et al.
(Continued)

FOREIGN PATENT DOCUMENTS

JP     6-284577 A    10/1994
JP     2007-9804 A    1/2007
(Continued)

OTHER PUBLICATIONS

International Search Report (PCT/ISA/210) issued in PCT Application No. PCT/JP2016/062049 dated Jun. 28, 2016 with English-language translation (five (5) pages).
(Continued)

*Primary Examiner* — Tulsidas C Patel
*Assistant Examiner* — S. Mikailoff
(74) *Attorney, Agent, or Firm* — Crowell & Moring LLP

(57) ABSTRACT

In order to maintain a system frequency within a permissible range under limitations of the output of a power source to be controlled, a calculation device pertaining to a load-frequency-controlling device of the present invention: predicts time-series data indicating the status of individual power sources in a future control period, the prediction being carried out on the basis of system model data, system data, and renewable energy data; calculates, on the basis of power source data, and for each of the power sources, at least any one of a deviation state indicating the degree to which the time-series data deviates from the limitations and/or a surplus state indicating the degree to which the time-series data shows a surplus with respect to the limitations; resolves the
(Continued)

deviation state; and calculates the amount of adjustment in the output of each of the power sources, on the basis of the deviation state and the surplus state, under the condition that the total output of the power sources is maintained.

12 Claims, 28 Drawing Sheets

(52) U.S. Cl.
CPC ................. *H02J 3/28* (2013.01); *H02J 3/38* (2013.01); *H02J 3/386* (2013.01); *H02J 3/46* (2013.01)

(56) References Cited

U.S. PATENT DOCUMENTS

| | | | |
|---|---|---|---|
| 2012/0306202 A1* | 12/2012 | Takahashi | F03D 7/028 290/44 |
| 2012/0323389 A1 | 12/2012 | Shelton et al. | |
| 2017/0353033 A1* | 12/2017 | Kuroda | H02J 3/24 |
| 2018/0152020 A1* | 5/2018 | Kuroda | H02J 3/00 |
| 2018/0262010 A1* | 9/2018 | Kato | H02J 3/00 |

FOREIGN PATENT DOCUMENTS

| | | |
|---|---|---|
| JP | 2013-126260 A | 6/2013 |
| JP | 2013-222423 A | 10/2013 |
| JP | 5465816 B1 | 4/2014 |
| JP | 2015-61511 A | 3/2015 |

OTHER PUBLICATIONS

Japanese-language Written Opinion (PCT/ISA/237) issued in PCT Application No. PCT/JP2016/062049 dated Jun. 28, 2016 (three (3) pages).

Extended European Search Report issued in counterpart European Application No. 16792479.4 dated Sep. 27, 2018 (seven (7) pages).

* cited by examiner

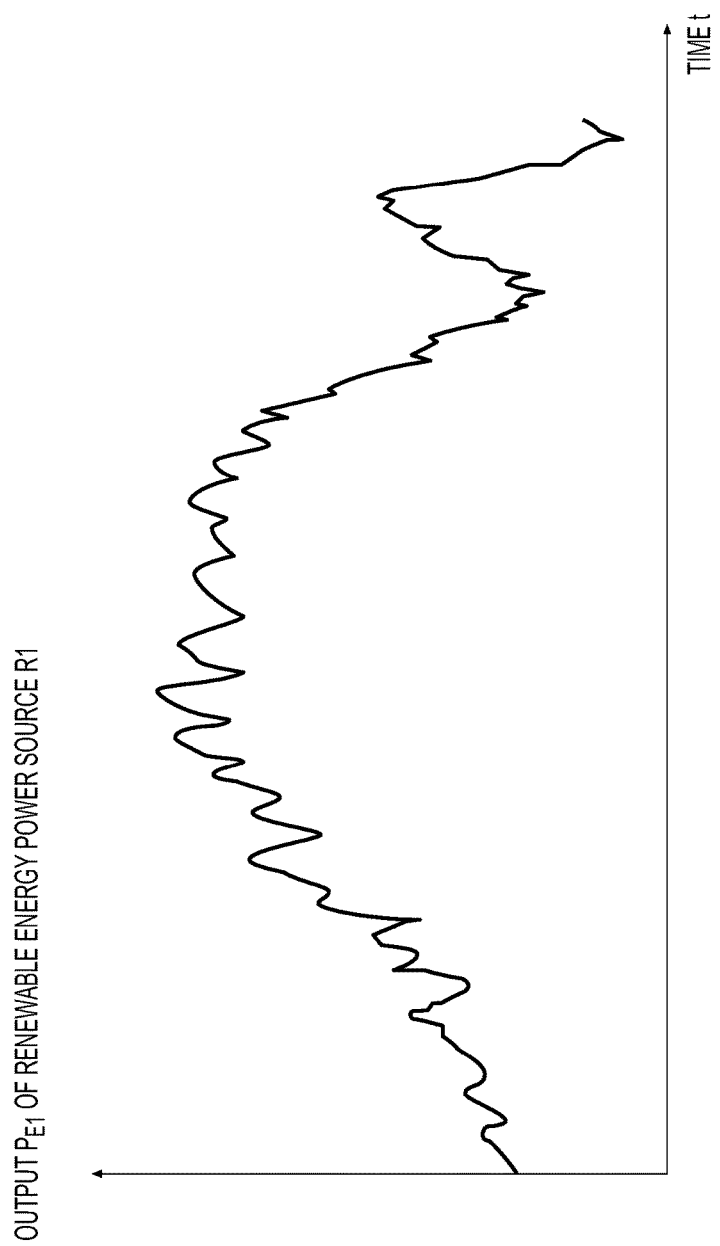

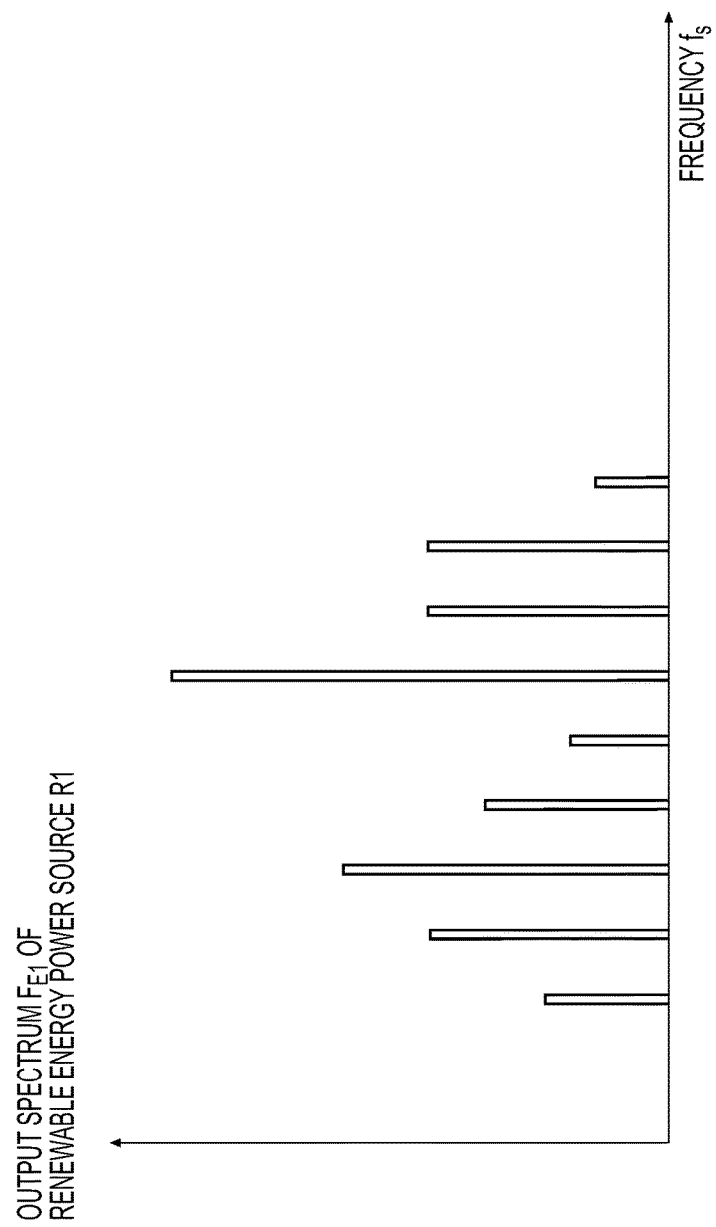

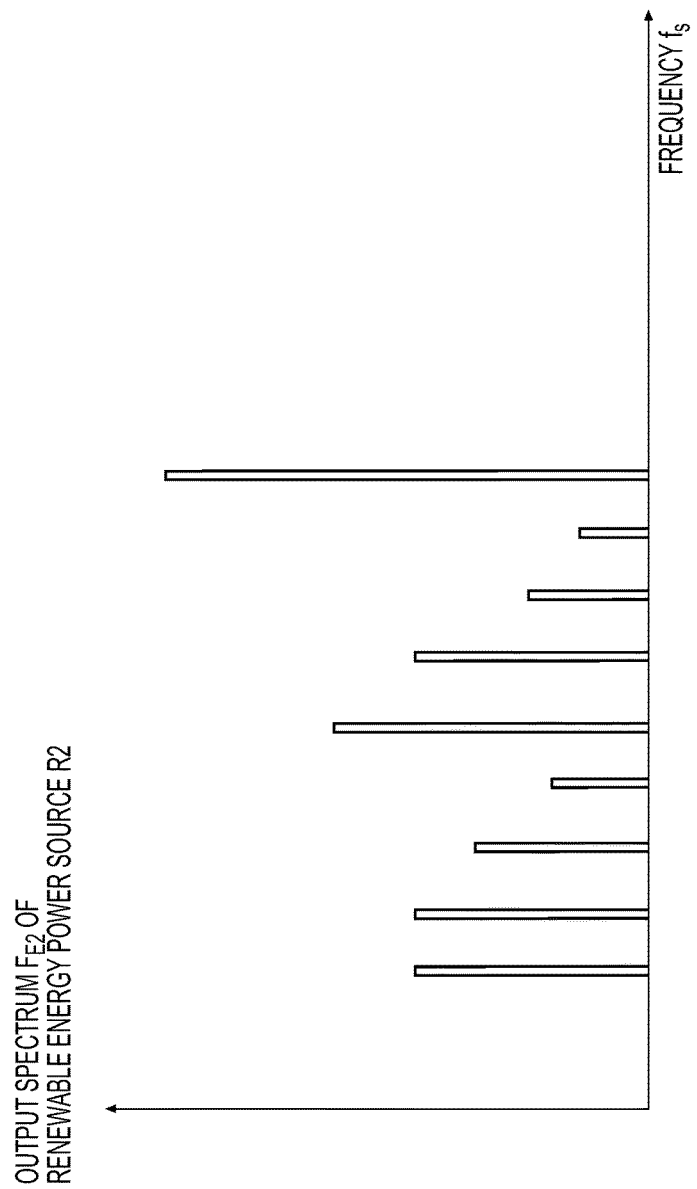

DEVICE AND METHOD FOR CONTROLLING POWER SYSTEM

TECHNICAL FIELD

The present invention relates to a device for controlling a load frequency.

BACKGROUND ART

In PTL 1, it is described that "Included are first control means 1B including detecting means 108 for detecting a voltage variation of a system, constant time occurrence checking means 109 for detecting and storing whether or not the voltage variation periodically occurs at a constant time, and state evaluating means 110 for predicting the system voltage after variation from the system voltage detected before a predetermined time of the occurrence time and selecting a tap of a voltage regulator that absorbs the variation, second control means 1C for changing the tap of the voltage regulator by an integral value of the deviation from the system voltage, and logic processing means for prioritizing anyone of the first control means 1B and the second control means 1C".

CITATION LIST

Patent Literature

PTL 1: JP-A-6-284577

SUMMARY OF INVENTION

Technical Problem

If a large amount of renewable energy (solar power generation and wind power generation) is introduced to the power system, and a power source composition ratio of the system frequency adjustment generator decreases, a tidal current variation increases, a supply and demand imbalance occurs, and a frequency fluctuation occurs. As PTL 1, even in a technology of controlling the system according to the variation, there are cases where desired adjustment power cannot be expected, due to the control speed of the adjustable generator and limitations on the controllable amount, and it is not possible to suppress the system frequency to a permissible range.

Solution to Problem

In order to solve the above problem, a device for controlling a load frequency according to one aspect of the present invention includes a storage device, and a calculation device connected to the storage device. The storage device, with respect to a power system including a renewable energy generator and a plurality of power sources, stores system model data indicating a model of the power system, system data indicating a state of the power system, renewable energy data indicating a past output of the renewable energy generator, and power source data indicating limitations of each power source. The calculation device predicts time-series data indicating the status of individual power sources in a future control period, the prediction being carried out on the basis of system model data, system data, and renewable energy data, calculates, on the basis of power source data, and for each of the power sources, a deviation state indicating the degree to which the time-series data deviates from the limitations and/or a surplus state indicating the degree to which the time-series data indicates a surplus with respect to the limitations, and calculates the amount of adjustment in the output of each of the power sources, on the basis of the deviation state and the surplus state, under the condition that the deviation state is resolved, and the total output of the power sources is estimated.

Advantageous Effects of Invention

It is possible to maintain a system frequency within a permissible range under limitations of the output of a power source to be controlled.

BRIEF DESCRIPTION OF DRAWINGS

FIGS. 4A and 4B show renewable energy output past data D11 of Example 1.
FIGS. 17A and 17B show renewable energy output past data D11 of Example 2.

DESCRIPTION OF EMBODIMENTS

Hereinafter, examples of the present invention will be described with reference to the drawings.

Example 1

Figure 1:
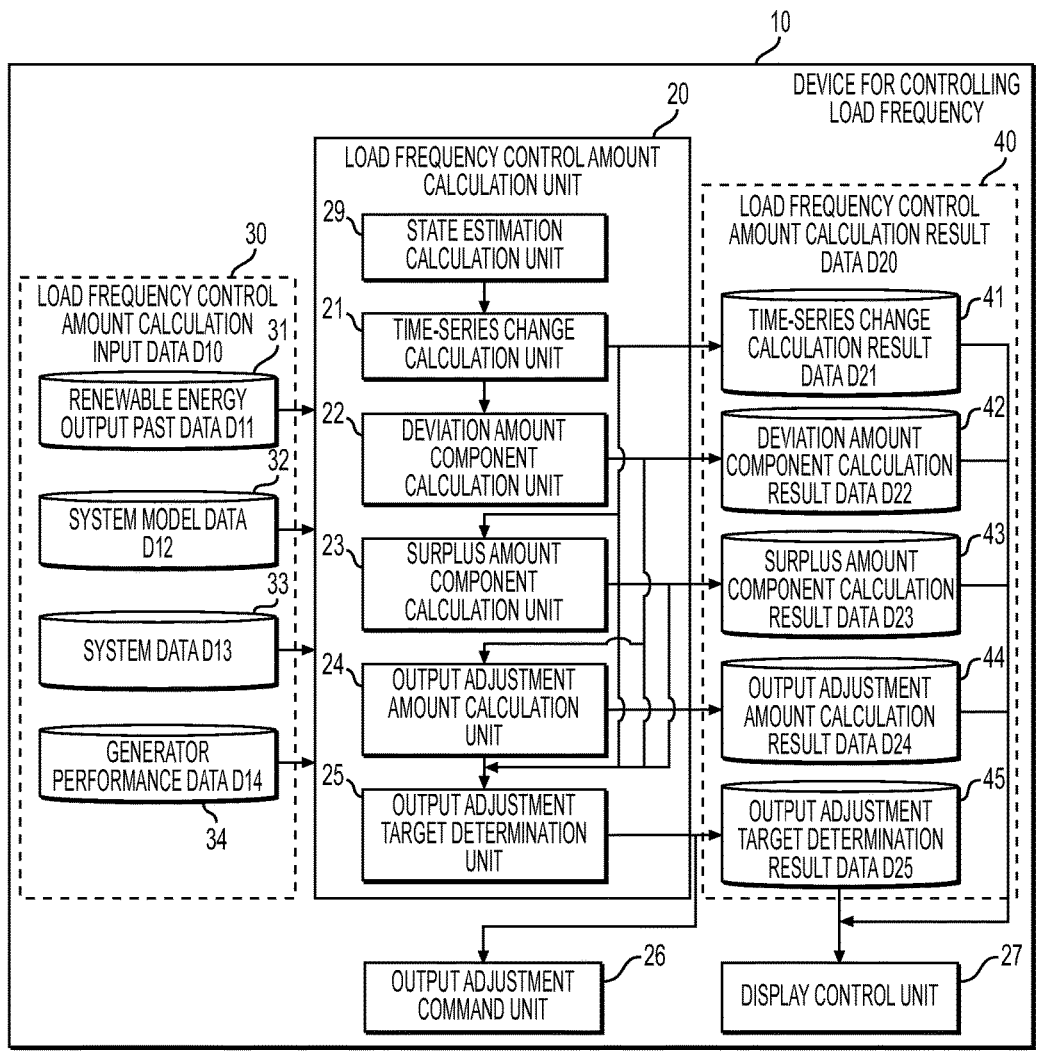
FIG. 1 shows a functional configuration of a device 10 for controlling a load frequency of Example 1.

FIG. 1 shows a functional configuration of a device 10 for controlling a load frequency of Example 1.

The device 10 for controlling a load frequency includes a load frequency control amount calculation input database 30 including a renewable energy output past database 31, a system model database 32, a system database 33, and a generator performance database 34; a load frequency control amount calculation unit 20 including a state estimation calculation unit 29, a time-series change calculation unit 21, a deviation amount component calculation unit 22, a surplus amount component calculation unit 23, an output adjustment amount calculation unit 24, and an output adjustment target determination unit 25; a load frequency control amount calculation result database 40 including a time-series change calculation result database 41, a deviation amount component calculation result database 42, a surplus amount component calculation result database 43, an output adjustment amount calculation result database 44, and an output adjustment target determination result database 45; an output adjustment command unit 26; and a display control unit 27.

The load frequency control amount calculation input data D10 which is input to the load frequency control amount calculation input database 30 includes renewable energy output past data D11, system model data D12, system data D13, and generator performance data D14.

The state estimation calculation unit 29 performs state estimation calculation by using the system model data D12 and the system data D13, outputs state estimation data, and includes it in the system data D13. The time-series change calculation unit 21 performs time-series change calculation by using the renewable energy output past data D11, the system model data D12, and the system data D13, and outputs the time-series change calculation result data D21. The deviation amount component calculation unit 22 performs deviation amount component calculation by using the time-series change calculation result data D21 and the generator performance data D14, and outputs deviation amount component calculation result data D22. The surplus amount component calculation unit 23 performs surplus amount component calculation by using the time-series change calculation result data D21 and the generator performance data D14, and outputs surplus amount component calculation result data D23. The output adjustment amount calculation unit 24 performs output adjustment amount calculation by using the deviation amount component calculation result data D22, and outputs the output adjustment amount calculation result data D24. The output adjustment target determination unit 25 determines the output adjustment target by using the time-series change calculation result data D21, the deviation amount component calculation result data D22, the surplus amount component calculation result data D23, and the output adjustment amount calculation result data D24, and outputs the output adjustment target determination result data D25. The output adjustment command unit 26 transmits the output adjustment command to the generator to be controlled, by using the output adjustment target determination result data D25.

Among the generators to be monitored by the device 10 for controlling a load frequency, a generator of which an output can be controlled according to the output command value is called a generator to be controlled. In other words, the generator to be controlled includes a power source such as a turbine generator and a power storage device, and does not include a renewable energy generator.

In addition, the output adjustment command unit 26 may adjust the output command value by using the output adjustment target determination result data D25 and transmit the adjusted output command value to the generator to be controlled.

The display control unit 27 uses the load frequency control amount calculation result data D20 to display the information of each calculation result on the display device.

Figure 2:
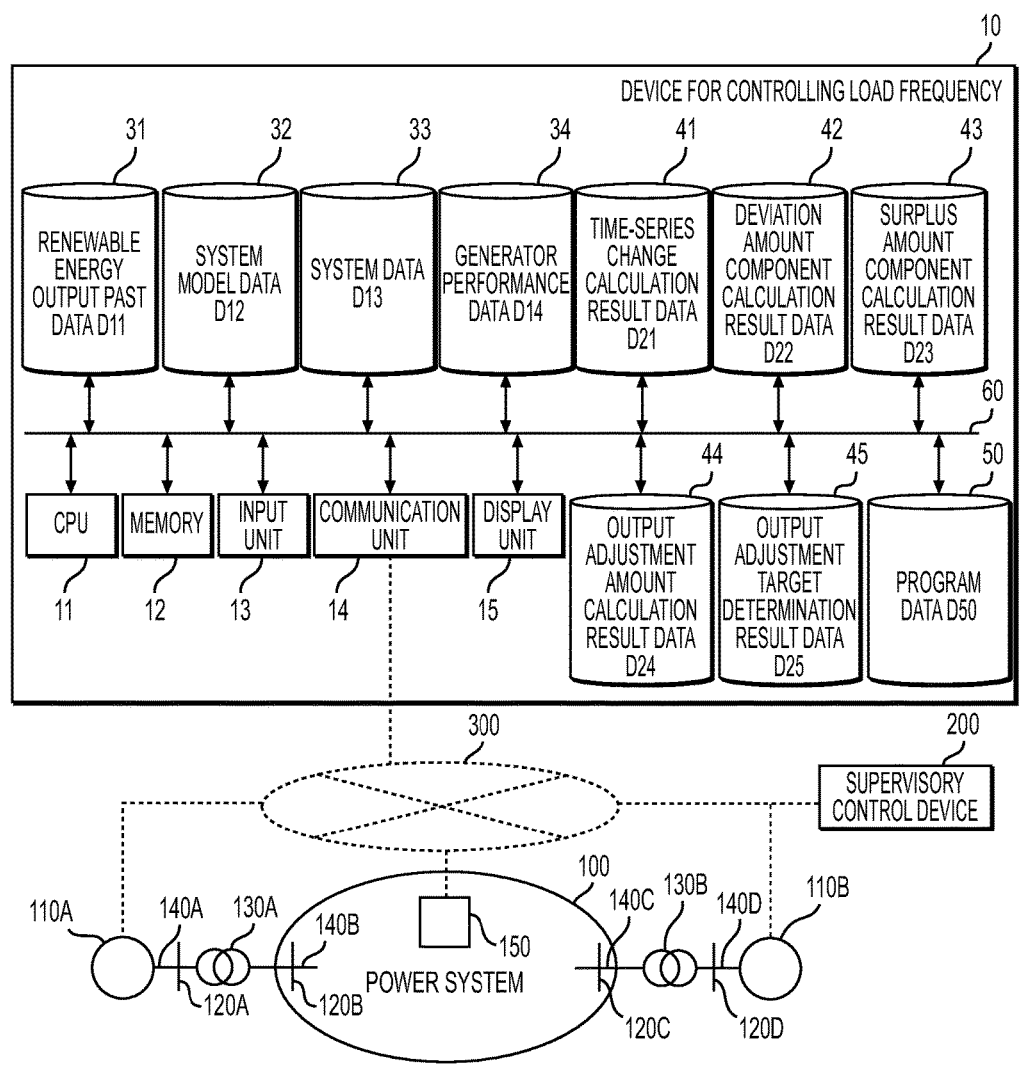
FIG. 2 shows a hardware configuration of the device 10 for controlling a load frequency and a power system of Example 1.

FIG. 2 shows a hardware configuration of the device 10 for controlling a load frequency and a power system of Example 1.

FIG. 2 shows the device 10 for controlling a load frequency, a supervisory control device 200, a power system 100, a measurement device 150, a generator 110, a bus 120, a transformer 130, and a power transmission line 140. Hereinafter, in a case where it is not necessary to distinguish elements by the alphabet in the reference symbol, the alphabet is omitted. The transformer 130 is connected to the power system 100 through the branch (line) 140 and the node (bus) 120. The generator 110 is connected to the transformer 130 through the branch 140 and the node 120. The power system 100 may include any one of the generator 110, the transformer 130, the measurement device 150, and a load and a controllable device (such as a battery, a rechargeable secondary battery, an EV storage battery, and a flywheel), which are not shown.

Here, examples of the generator 110 include distributed power sources such as solar power generation and wind power generation, in addition to large-scale power sources such as thermal power generators, hydraulic power generators and nuclear power generators.

Here, an example of the measurement device 150 is a device (voltage transformer (VT), potential transformer (PT) or a current transformer (CT)) that measures one or more of a node voltage V, a branch current I, a power factor $\Phi$, active power P, and reactive power Q, and includes a function of transmitting data including a data measurement part identification ID and a built-in time stamp of the measurement device (such as a telemeter). In addition, the measurement device 150 may be a device that measures power information (phasor information of power) with absolute time-based using global positioning system (GPS), a phase measurement device (PMU: phasor measurement units), or other measurement devices. In FIG. 2, the measurement device 150 is illustrated as being in the power system 100, but it may be installed in the node 120, the branch 140, or the like outside the power system 100.

Here, the example of the system data D13 is various types of measurement data measured by the measurement device 150, and is received in the system database 33 through the communication network 300. However, instead of receiving the system data D13 directly from the measurement device 150, the device 10 for controlling a load frequency may receive the system data D13, which is once aggregated by the supervisory control device 200, in the system database 33, through the communication network 300, or may receive it in the system database 33 through the communication network 300 from both the measurement device 150 and the supervisory control device 200. In addition, the system data D13 may include a unique number for identifying data and a time stamp. In addition, although the system data D13 is written as measured data, it may be retained in the system database 33 in advance. The system data D13 may include an output instruction from a central power feed command office or the like.

The device 10 for controlling a load frequency includes a display unit 15, an input unit 13 such as a keyboard and a mouse, a communication unit 14, a computer or computer server (CPU: Central Processing Unit) 11, a memory 12, and various databases (the renewable energy output past database 31, the system model database 32, the system database 33, the generator performance database 34, the time-series change calculation result database 41, the deviation amount component calculation result database 42, the surplus amount component calculation result database 43, the output adjustment amount calculation result database 44, the output adjustment target determination result database 45, and the program database 50). Each of these units is connected to the bus line 60.

Further, a storage device including the renewable energy output past database 31, the system model database 32, the system database 33, the generator performance database 34, the time-series change calculation result database 41, the deviation amount component calculation result database 42, the surplus amount component calculation result database 43, the output adjustment amount calculation result database 44, the output adjustment target determination result database 45, the program database 50, the memory 12, or the like may be used. A calculation device including the CPU 11 or the like may be used.

The display unit 15 is, for example, a display device. For example, the display unit 15 may include a printer device, a sound output device, or the like, instead of or in addition to the display device. For example, the input unit 13 may include at least one of a keyboard switch, a pointing device such as a mouse, a touch panel, a voice instruction device, or the like. Included are a communication unit 14, a circuit for connection to the communication network 300, and a circuit that processes a communication protocol. The CPU 11 reads and executes a predetermined computer program from the program database 50. The CPU 11 may be one or a plurality of semiconductor chips, or may be a computer device such as a calculation server. The memory 12 is, for example, a random access memory (RAM), and stores computer programs read from the program database 50, or stores calculation result data, image data, or the like necessary for each process. The screen data stored in the memory 12 is sent to the display unit 15 by the CPU 11 and displayed. An example of the screen to be displayed will be described later.

The supervisory control device 200 monitors the state of the power system 100 and performs control for maintaining the supply-demand balance. Further, the supervisory control device 200 may include the device 10 for controlling a load frequency.

Figure 3:
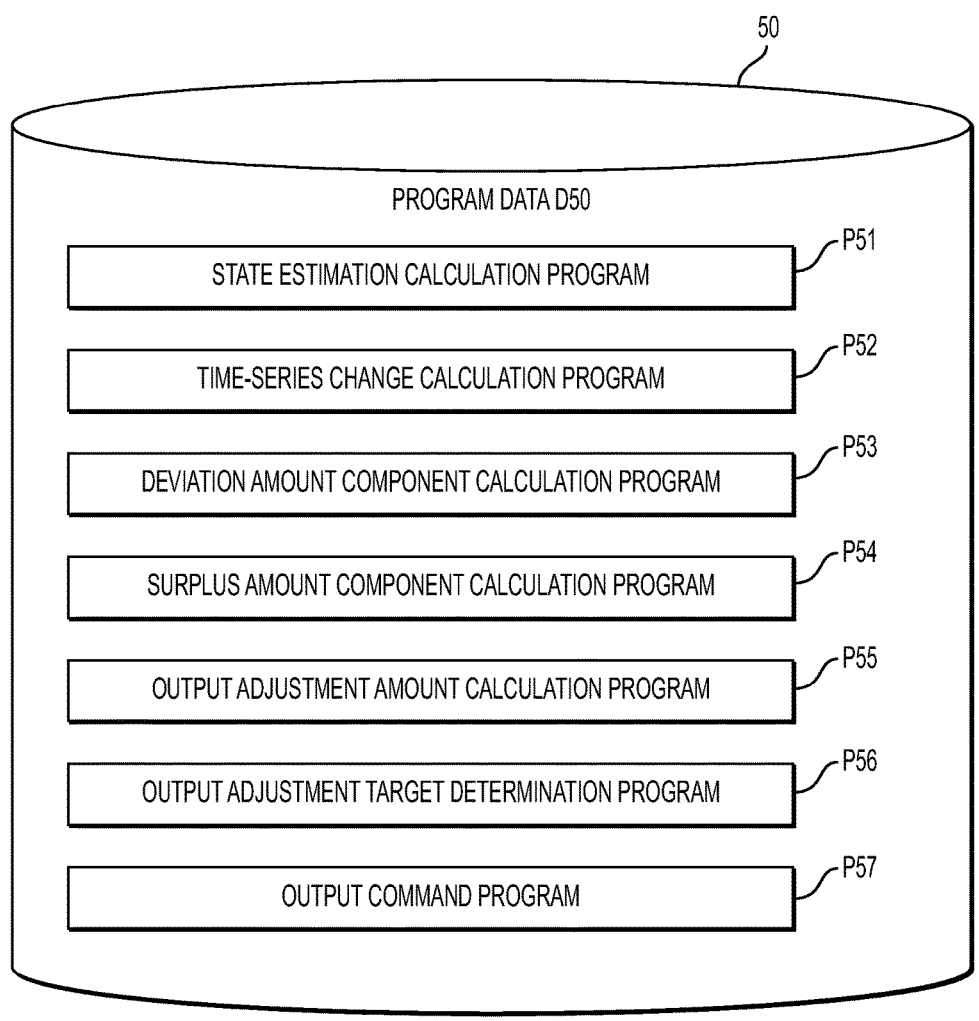
FIG. 3 shows stored contents of a program database 50 of Example 1.

FIG. 3 shows stored contents of the program database 50 of Example 1.

In the program database 50, for example, a state estimation calculation program P51, a time-series change calculation program P52, a deviation amount component calculation program P53, a surplus amount component calculation program P54, an output adjustment amount calculation program P55, an output adjustment target determination program P56, and an output command program P57 are stored as a calculation program (program data D50).

The CPU 11 executes the calculation program read out from the program database 50 into the memory 12 to calculate a plausible system state, calculate a time-series change, calculate a deviation amount component, calculate a surplus amount component, calculate an output adjustment amount, determine an output adjustment target, give a command of an output adjustment amount, give an instruction of image data to be displayed, retrieve data in various databases, and the like.

The state estimation calculation unit 29, the time-series change calculation unit 21, the deviation amount component calculation unit 22, the surplus amount component calculation unit 23, the output adjustment amount calculation unit 24, the output adjustment target determination unit 25, and the output adjustment command unit 26 are respectively realized by the state estimation calculation program P51, the time-series change calculation program P52, the deviation amount component calculation program P53, the surplus amount component calculation program P54, the output adjustment amount calculation program P55, the output adjustment target determination program P56, and the output command program P57.

The device 10 for controlling a load frequency executes the calculation of the load frequency control amount calculation unit 20 for each periodic control period. The length of the control period is determined on the basis of the measurement cycle of the measurement device 150, the control cycle of transmitting a command to the generator, and the like. Further, the control period is set to a future period, on the basis of a delay due to calculation or a delay due to control of the generator 110.

The memory 12 is a memory that temporarily stores calculated temporary data such as display image data, output adjustment data, output adjustment result data, and calculation result data. The CPU 11 generates necessary image data, and displays it on the display unit 15 (for example, a display screen). The display unit 15 may display each control program, and a simple screen only for rewriting a database.

Ten databases are roughly stored in the device 10 for controlling a load frequency. Hereinafter, except for the program database 50, the renewable energy output past database 31, the system model database 32, the system database 33, the generator performance database 34, the time-series change calculation result database 41, the deviation amount component calculation result database 42, the surplus amount component calculation result database 43, the output adjustment amount calculation result database 44, and the output adjustment target determination result database 45 will be described.

Figure 4B:
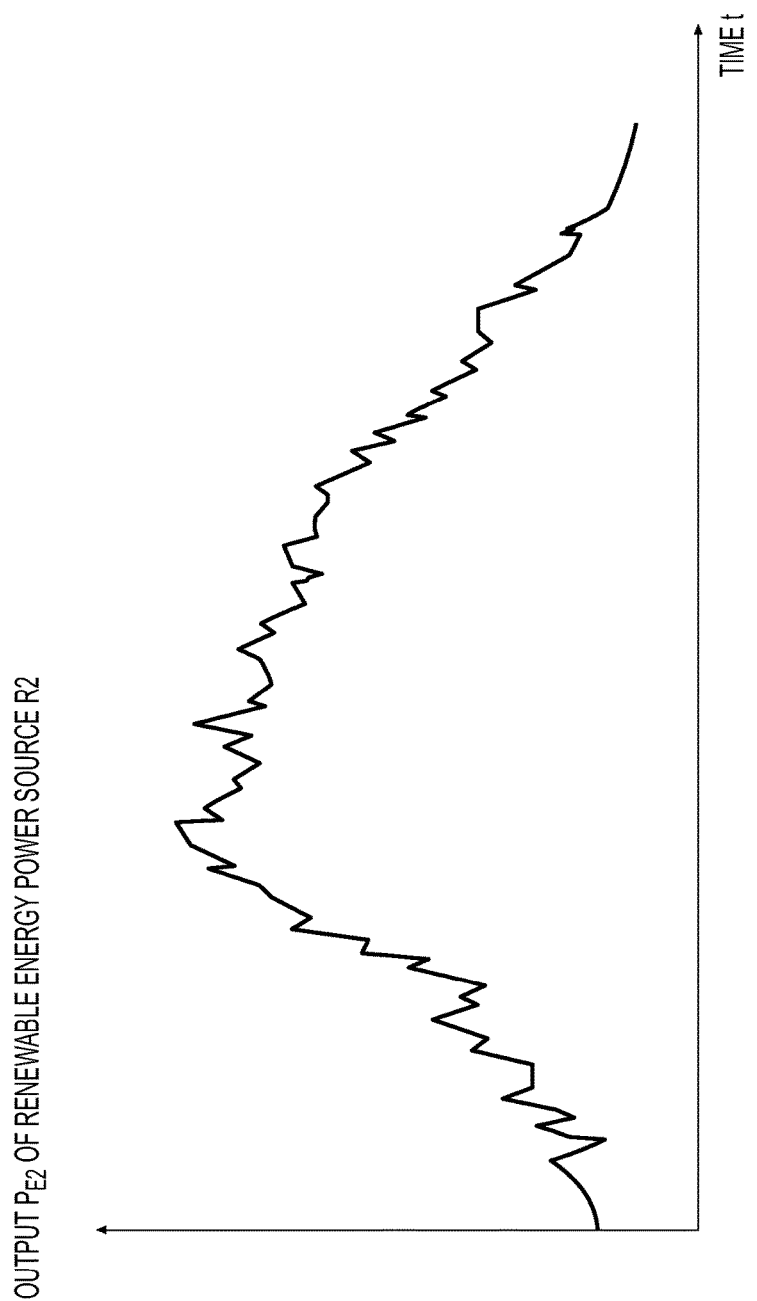

FIG. 4 shows renewable energy output past data D11 of Example 1.

The renewable energy output past database 31 includes renewable energy output time-series data which indicates actual values of outputs of renewable energy generators such as a solar power generator and a wind power generator during a specific period in the past, and which are time-series data which is measured for each measurement cycle which is set in advance, as the renewable energy output past data D11. The renewable energy output time-series data includes samples for each preset measurement cycle. The time width (length) of the renewable energy output time-series data may be daily, monthly, yearly, or any time unit of data. Thus, the device 10 for controlling a load frequency can change the time width of the renewable energy output time-series data in accordance with the control period.

Note that the renewable energy output time-series data may be classified for each season, weather, or time zone. In this case, the device 10 for controlling a load frequency selects renewable energy output time-series data suitable for the classification of the control period. For example, if the control period is summer, calculation is performed using renewable energy output time-series data of the past summer. Thus, the device 10 for controlling a load frequency can use the renewable energy output time-series data in an environment close to the environment of the control period, and can improve the accuracy of the prediction of the system frequency and the output command value.

In the system model database 32, as the system model data D12, a system configuration, a line impedance (R+jX), aground capacitance (admittance: Y), data necessary for state estimation (a threshold of bat data, or the like), generator data, and other necessary data for power flow calculation, state estimation, time-series change calculation are included.

In addition, the operator may manually input data using the input unit 13 and store it in the system model database 32. Upon inputting, the CPU 11 generates necessary image data and displays it on the display unit 15. Upon inputting, the CPU 11 may make it semi-manual so that a large amount of data can be set using the supplement function.

In the system database 33, the active power P, the reactive power Q, the voltage V, the voltage phase angle δ, the current I, the power factor Φ, and the like are included as the system data D13. The data with a time stamp may be PMU data. For example, as the system data D13, the voltages and voltage phase angles at the nodes 120B and 120C connected to the power system 100, line currents (P+jQ) of the branches 140B and 140C respectively connected to the nodes 120B and 120C, line currents (P+jQ) of the transformers 130A and 130B respectively connected to the nodes 120B and 120C, the voltages V and voltage phase angles δ of the nodes 120A and 120D respectively connected to the transformers 130A and 130B, the active power P, the reactive power Q, and the power factor Φ of the generators 110A and 110B respectively connected to the nodes 120A and 120D, and active power P, reactive power Q, power factors Φ, voltages V and voltage phase angles δ measured through the communication network by the measurement device 150, the supervisory control device 200, or the like for other nodes, branches, generators, loads and control devices connected to the power system 100 are stored. In addition, the voltage phase angle δ may be measured by using the PMU or another measurement device using GPS. Further, the measurement device 150 is a VT, a PT, or the like. The line current (P+jQ) can be calculated from the current I, the voltage V and the power factor Φ measured by the VT, the PT, or the like. Further, the state estimation calculation program P51 calculates plausible values of the active power P, the reactive power Q, the voltage V, the voltage phase angle δ, the current I, and the power factor Φ for each of nodes, branches, generators, loads, and control equipment, and stores the obtained state estimation data in the system data D13.

Figures 5, 6:
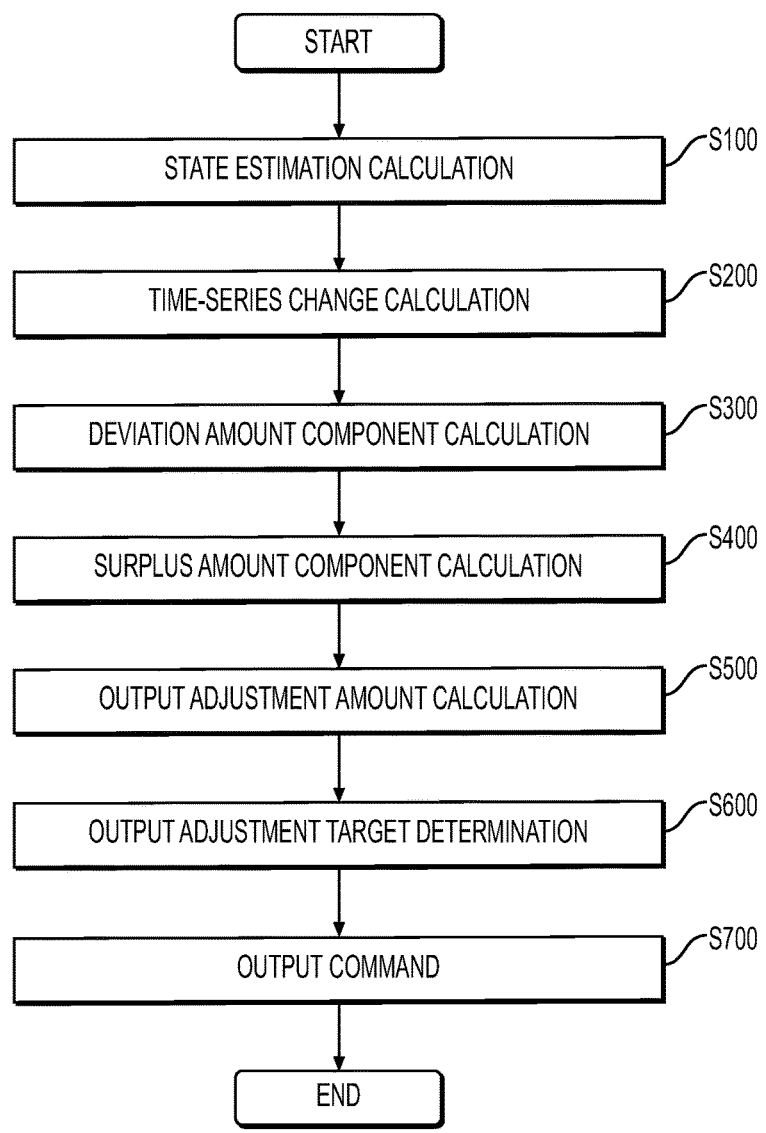
FIG. 5 shows generator performance data D14.
FIG. 6 shows a process of the device 10 for controlling a load frequency of Example 1.

FIG. 5 shows the generator performance data D14.

The generator performance database 34 includes an output range (limitation, range) for each generator to be controlled, as the generator performance data D14. The output range is determined by an output upper limit value and an output lower limit value.

The time-series change calculation result database 41 includes time-series change calculation result data D21 calculated by the time-series change calculation program P52, using the renewable energy output past data D11, the system model data D12, and the system data D13. For example, the time-series change calculation result data D21 includes system frequency variation time-series data which is a predicted value of a time-series change of variation of the system frequency of the power system 100 in the future control period, and output command value time-series data (time-series data) which is a predicted value of the time-series change of the output command value of each generator to be controlled. Each of the system frequency variation time-series data and the output command value time-series data has a sample for each measurement cycle. Details of a method of calculating the time-series change and the time-series change calculation result data D21 will be described later.

The deviation amount component calculation result database 42 includes the deviation amount component calculation result data D22 calculated by the deviation amount component calculation program P53, using the time-series change calculation result data D21 and the generator performance data D14. The deviation amount component calculation result data D22 is, for example, an upper limit deviation amount component indicating the deviation amount from the output upper limit value of the output command value, a lower limit deviation amount component indicating the deviation amount from the output lower limit value of the output command value, or the like, in the control period, with respect to the deviant generator estimated that the output command value deviates from the output upper and lower limit values. Details of a method of calculating the deviation amount component will be described later.

The surplus amount component calculation result database 43 includes the surplus amount component calculation result data D23 calculated by the surplus amount component calculation program P54, using the time-series change calculation result data D21 and the generator performance data D14. Examples include, in the control period, an upper limit surplus amount component indicating a surplus amount between the output command value and the output upper limit value of the non-deviant generator estimated that the output command value does not deviate from the output upper and lower limit values, a lower limit surplus amount component indicating a surplus amount between the output command value and the output lower limit value of the generator, or the like. Details of a method of calculating the surplus amount component will be described later.

The output adjustment amount calculation result database 44 includes the output adjustment amount calculation result data D24 calculated by the output adjustment amount calculation program P55, using the deviation amount component calculation result data D22. A method of calculating the output adjustment amount will be described later.

The output adjustment target determination result database 45 includes the output adjustment target determination result data D25 calculated by the output adjustment target determination program P56, using the time-series change calculation result data D21, the deviation amount component calculation result data D22, the surplus amount component calculation result data D23, and the output adjustment amount calculation result data D24. A method of determining the output adjustment target will be described later.

The process of the device 10 for controlling a load frequency will be described below.

FIG. 6 shows a process of the device 10 for controlling a load frequency of Example 1.

In step S100, the state estimation calculation unit 29 performs state estimation calculation, using the system model data D12 and the system data D13. Next, in step S200, the time-series change calculation unit 21 performs a time-series change calculation, using the result of the state estimation calculation, the renewable energy output past data D11, and the system model data D12. Next, in step S300, the deviation amount component calculation unit 22 performs a deviation amount component calculation, using the time-series change calculation result data D21 and the generator performance data D14. Next, in step S400, the surplus amount component calculation unit 23 performs a surplus amount component calculation, using the time-series change calculation result data D21 and the generator performance data D14. Next, in step S500, the output adjustment amount calculation unit 24 performs output adjustment amount calculation using the deviation amount component calculation result data D22. Next, in step S600, the output adjustment target determination unit 25 determines an output adjustment target using the time-series change calculation result data D21, the deviation amount component calculation result data D22, the surplus amount component calculation result data D23, and the output adjustment amount calculation result data D24. Finally, in step S700, the output adjustment command unit 26 issues an output command to a generator which is an output adjustment target, using the output adjustment target determination result data D25.

With this process, the device 10 for controlling a load frequency can keep the system frequency within the range of the system frequency upper and lower limit values which are set in advance.

In addition, various calculation results and data accumulated in the memory 12 during the calculation may be sequentially displayed on the screen of the supervisory control device 200. Thereby, the operator can easily recognize the operating situation of the device 10 for controlling a load frequency. The details of the above process will be described step by step.

First, in step S100, the state estimation calculation unit 29 performs state estimation calculation by using the system model data D12 and the system data D13, and stores the calculation result in the system database 33. The state estimation calculation here includes the result obtained by estimating the active power P, the reactive power Q, the voltage V, the voltage phase angle δ, the current I, and the power factor Φ of each of nodes, branches, generators, loads, and control equipment of a plausible system, in the system data D13, as system measurement data. Further, a state estimation calculation method is performed according to a known method. Further, in a case where the system data D13 necessary for subsequent calculation is stored, the device 10 for controlling a load frequency may not perform the state estimation calculation.

In step S200, the time-series change calculation unit 21 performs time-series change calculation by using the state estimation result obtained in step S100, the system model data D12, and the renewable energy output past data D11, and stores the calculation result in the time-series change calculation result database 41. Here, details of step S200 will be described.

Figure 7:
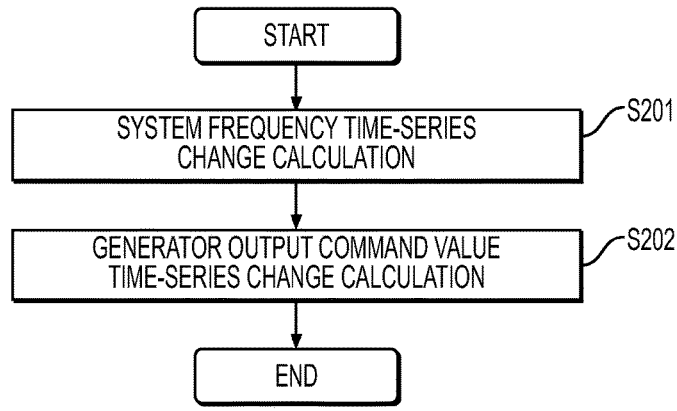
FIG. 7 shows a process of a time-series change calculation unit 21 of Example 1.

FIG. 7 shows a process of a time-series change calculation unit 21 of Example 1.

In step S201, the time-series change calculation unit 21 predicts system frequency variation time-series data, using the state estimation result obtained in step S100, the system model data D12, and the renewable energy output past data D11. In step S202, the time-series change calculation unit 21 predicts output command value time-series data, using the state estimation result obtained in step S100, the system model data D12, and the renewable energy output past data D11. As a method of calculating each time-series change is performed according to a known method. The above is the details of step S200.

Instead of the output command value of the generator to be controlled, a value indicating the state of the generator to be controlled, such as the output of the generator to be controlled, may be predicted.

In step S300, the deviation amount component calculation unit 22 calculates the deviation amount component, using the time-series change calculation result and the generator performance data D14, and stores the calculation result in the deviation amount component calculation result database 42. Here, details of step S300 will be described.

Figure 8:
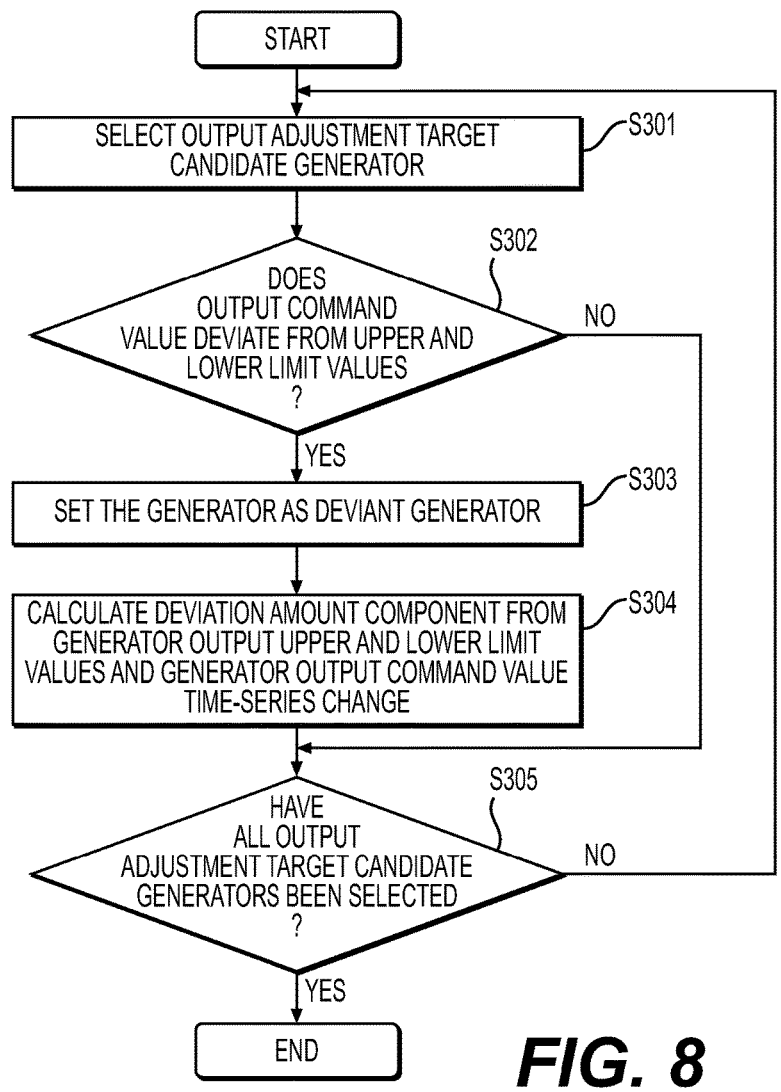
FIG. 8 shows a process of a deviation amount component calculation unit 22 of Example 1.

FIG. 8 shows a process of a deviation amount component calculation unit 22 of Example 1.

In step S301, the deviation amount component calculation unit 22 reads out the time-series change calculation result data D21, selects one generator to be controlled as the output adjustment target candidate generator in order from among generators to be controlled, and reads the output command value time-series data of the output adjustment target candidate generator into the memory 12. In step S302, the deviation amount component calculation unit 22 reads out the output upper and lower limit values of the output adjustment target candidate generator, from the generator performance data D14, into the memory 12, and determines whether the output command value deviates from the output upper limit value or the output lower limit value, using the output command value time-series data and the output upper and lower limit values of the output adjustment target candidate generator. Here, in a case where the output command value deviates from the output upper limit value or the output lower limit value, the deviation amount component calculation unit 22 proceeds to step S303. On the other hand, in a case where the output command value does not deviate from the output upper limit value or the output lower limit value, the deviation amount component calculation unit 22 proceeds to step S305. In step S303, the deviation amount component calculation unit 22 sets the output adjustment target candidate generator as a deviant generator (deviant power source), and saves the setting contents in the time-series change calculation result database 41. In step S304, a deviation amount component is calculated from the output command value and the output upper and lower limit values of the output adjustment target candidate generator, and the calculation result is stored in the deviation amount component calculation result database 42. In step S305, it is determined whether all the output adjustment target candidate generators have been selected. In a case where all the output adjustment target candidate generators have not been selected, the process returns to step S301; and in a case where all the output adjustment target candidate generators have been selected, the process is ended.

Figure 9A:
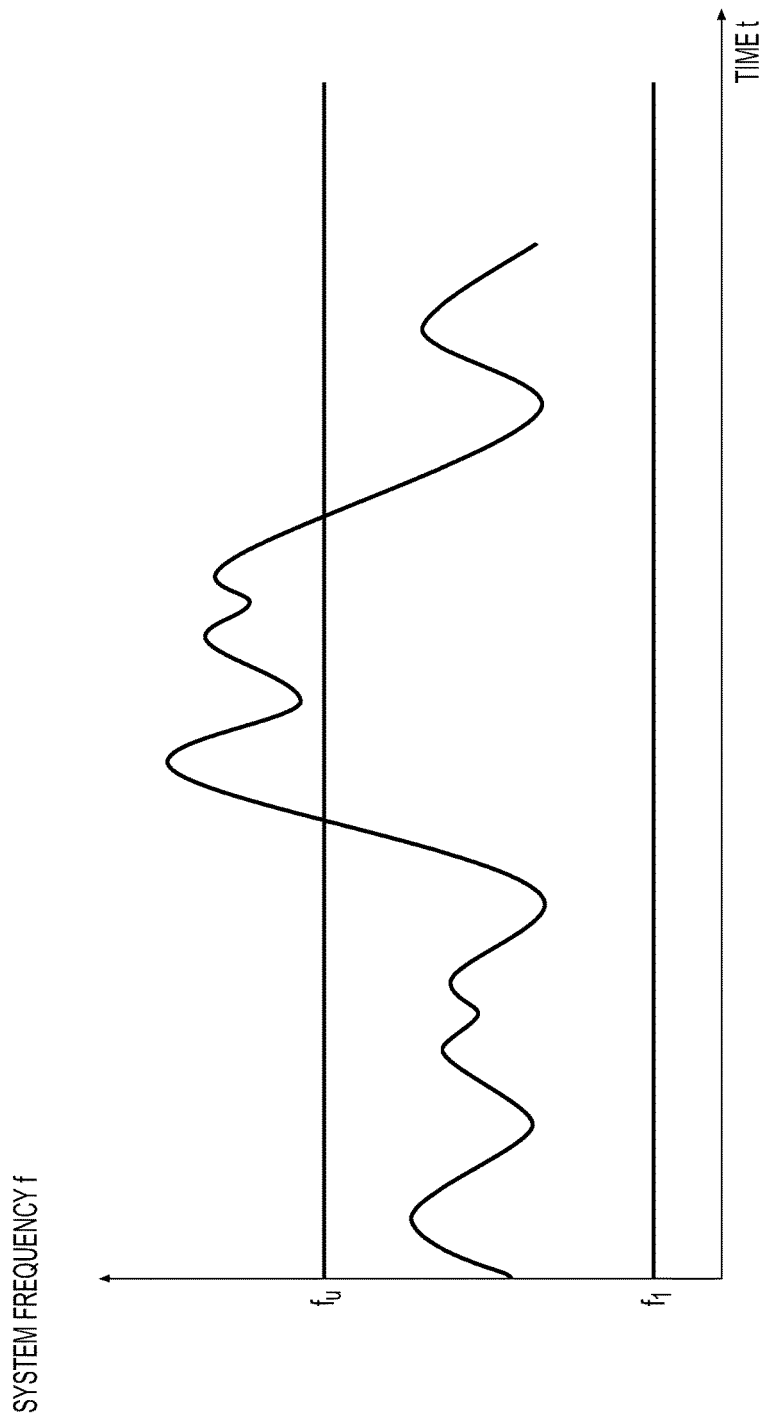
FIGS. 9A, 9B, and 9C show time-series change calculation result data D21.
Figure 9B:
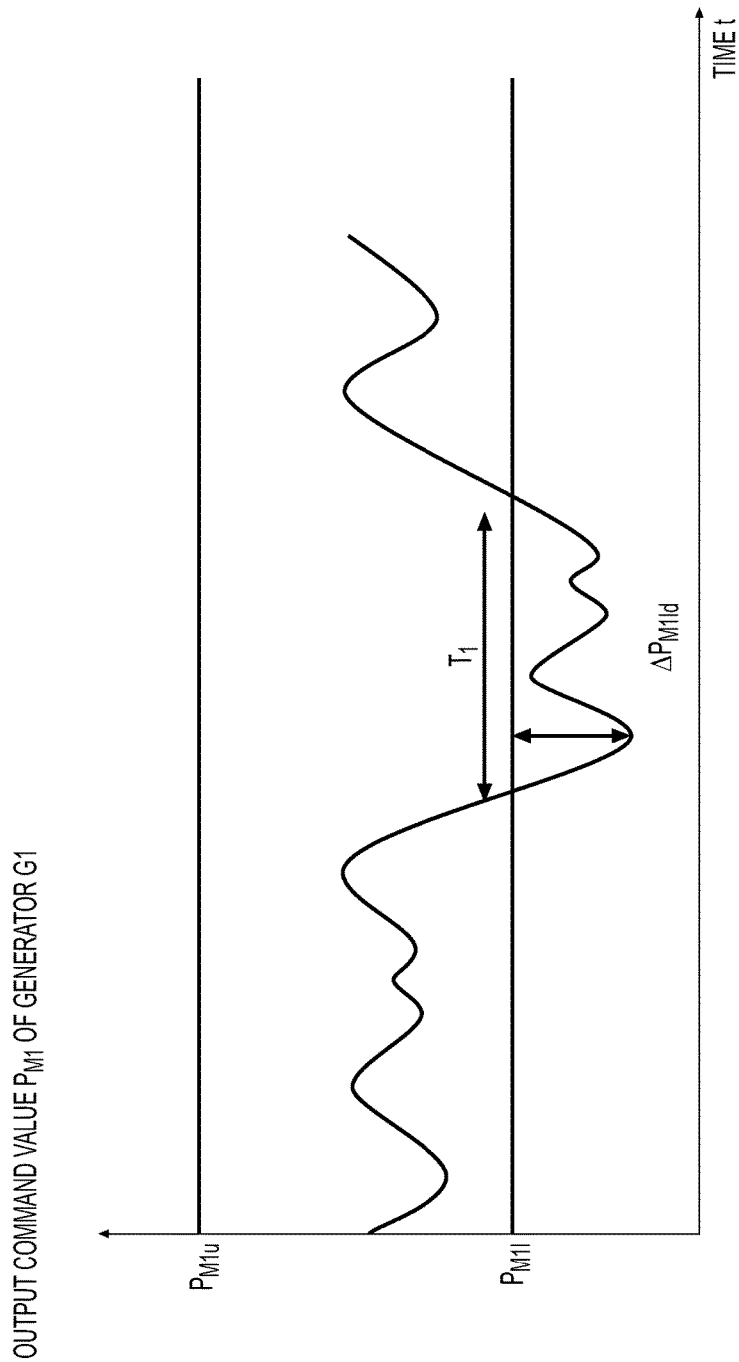
Figure 9C:
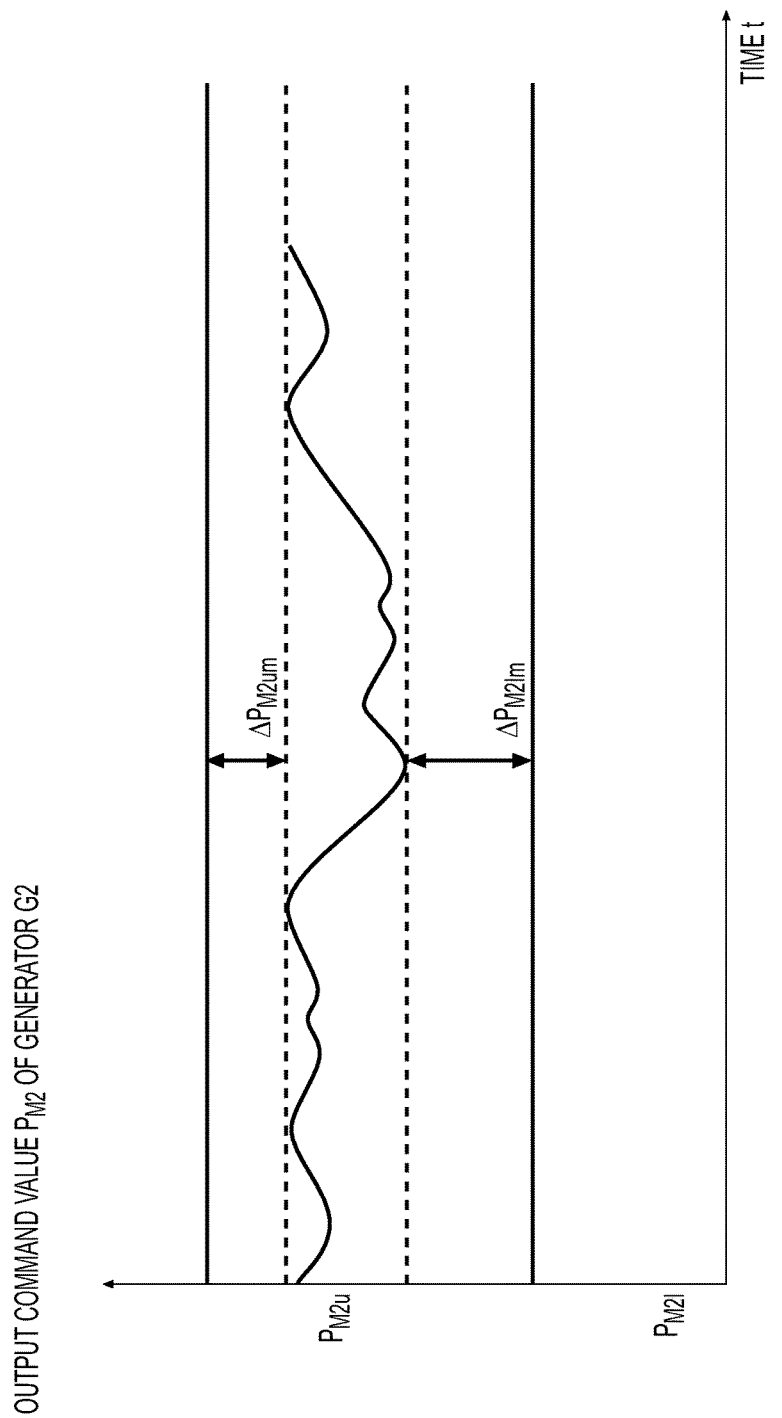

FIG. 9 shows the time-series change calculation result data D21.

The time-series change calculation result data D21 here includes system frequency variation time-series data f(t), output command value time-series data $P_{M1}(t)$ of the generator G1 to be controlled, and output command value time-series data $P_{M2}(t)$ of the generator G2 to be controlled, which are predicted for control period. Here, the system frequency variation time-series data f(t) exceeds the system frequency upper limit value $f_u$, among the system frequency upper limit value $f_u$ and the system frequency lower limit value $f_l$, which are set in advance. Further, the generator G1 to be controlled is determined to be a deviant generator. Further, the output command value time-series data $P_{M1}(t)$ of the deviant generator G1 shows the lower limit deviation amount component $\Delta P_{M1ld}$ and the time zone $T_1$ in which the output command value is lower than the output lower limit value.

In a case where the output command value $P_{M1}(t)$ of the deviant generator G1 is below than $P_{M1l}$, the deviation amount component calculation unit 22 calculates the minimum value of the difference obtained by subtracting $P_{M1l}$ from $P_{M1l}(t)$ in the time period $T_1$ in which the output command value time-series data $P_{M1}(t)$ is below than the output lower limit value $P_{M1l}$ as a lower limit deviation amount component $\Delta P_{M1ld}$, by using the output command value time-series data $P_{M1}(t)$ of the deviant generator G1, the output lower limit value $P_{M1l}$, and the following Expression (1).

[Expression 1]

$$\Delta P_{M1ld} = \min_{t \in T_l} \{P_{M1}(t) - P_{M1l}\} \quad (1)$$

Further, in a case where the output command value $P_{M1}(t)$ of the deviant generator G1 is exceeds $P_{M1u}$, the deviation amount component calculation unit 22 calculates the maximum value of the difference obtained by subtracting the output upper limit value $P_{M1u}$ from the output command value $P_{M1u}(t)$ in the time period $T_u$ in which the output command value $P_{M1}(t)$ exceeds the output upper limit value $P_{M1u}$ as an upper limit deviation amount component $\Delta P_{M1ud}$, by using the output command value time-series data $P_{M1}(t)$ of the deviant generator G1, the output upper limit value $P_{M1u}$, and the following Expression (2).

[Expression 2]

$$\Delta P_{M1ud} = \min_{t \in T_u} \{P_{M1}(t) - P_{M1u}\} \quad (2)$$

Here, $\Delta P_{M1ld}$ is negative and $\Delta P_{M1ud}$ is positive. Such a deviation amount component can be easily obtained from the output command value time-series data. This makes it easy for the system operator to understand the deviation amount component. In addition, the device 10 for controlling a load frequency may calculate and use other components as the deviation amount component (deviation state and deviation amount). For example, the deviation amount component calculation unit 22 may use a deviation time which is a length of time during which the output command value deviates from the output upper and lower limit values, or a deviation speed which is a inclination of a time change of the output command value at the moment when the output command value deviates from the output upper and lower limit values, as a deviation amount component.

Further, since there is a case where the deviation amount component is not present depending on the renewable energy output past data D11, the system data D13, and the system model data D12. In such a case, it is determined that there is no deviation amount component, and the process proceeds to step S305. The above is the details of step S300.

In step S400, the surplus amount component calculation unit 23 calculates the surplus amount component, using the time-series change calculation result data D21 and the generator performance data D14, and stores them in the surplus amount component calculation result database 43. Here, details of step S400 will be described.

Figure 10:
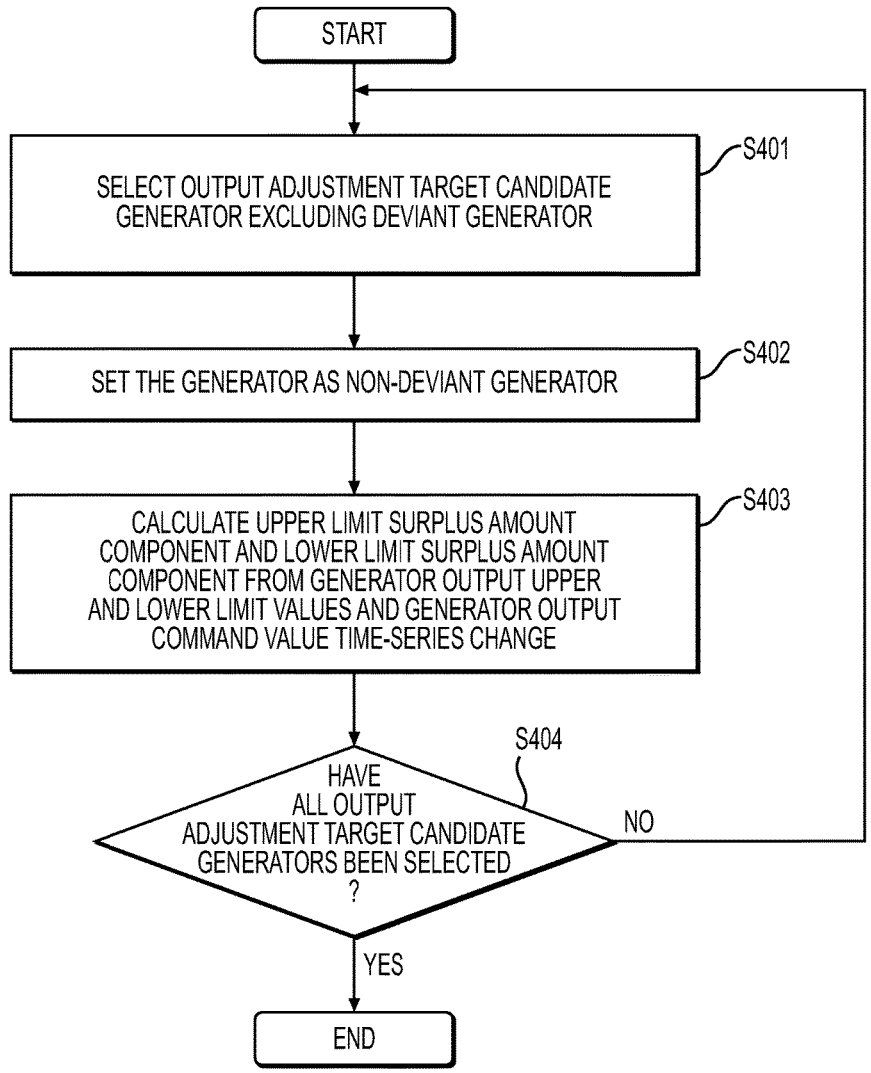
FIG. 10 shows a process of a surplus amount component calculation unit 23 of Example 1.

FIG. 10 shows a process of the surplus amount component calculation unit 23 of Example 1.

In step S401, the surplus amount component calculation unit 23 reads out the time-series change calculation result data D21, selects one generator to be controlled as the output adjustment target candidate generator in order, excluding the deviant generator, from among generators to be controlled, and reads the output command value time-series data of the output adjustment target candidate generator into the memory 12. In step S402, the surplus amount component calculation unit 23 sets the output adjustment target candidate generator as a non-deviant generator (non-deviant power source), and saves the setting contents in the time-series change calculation result database 41. In step S403, the surplus amount component calculation unit 23 reads out the output upper and lower limit values of the output adjustment target candidate generator from the generator performance data D14 into the memory 12, calculates the surplus amount component from the output command value time-series data of the output adjustment target candidate generator and the output upper and lower limit values, and stores it in the surplus amount component calculation result database 43. In step S404, the surplus amount component calculation unit 23 determines whether all the output adjustment target candidate generators excluding the deviant generator have been selected. In a case where all the output adjustment target candidate generators excluding the deviant generator have not been selected, the process returns to step S401; and in a case where all the output adjustment target candidate generators have been selected, the process is ended.

In the aforementioned FIG. 9, the generator G2 to be controlled is determined to be a non-deviant generator. In the output command value time-series data $P_{M2}(t)$ of the non-deviant generator G2, the upper limit surplus amount component $\Delta P_{M2um}$ and the lower limit surplus amount component $\Delta P_{M2lm}$ are shown.

The surplus amount component calculation unit 23 calculates the minimum value of the difference obtained by subtracting $P_{M2l}$ from $P_{M2}(t)$, as the lower limit surplus amount component $\Delta P_{M2lm}$, by using the output command value time-series data $P_{M2}(t)$ of the non-deviant generator G2, the output lower limit value $P_{M2l}$, and the following Expression (3).

[Expression 3]

$$\Delta P_{M2lm} = \min\{P_{M2}(t) - P_{M2l}\} \quad (3)$$

Further, the surplus amount component calculation unit 23 calculates the minimum value of the difference obtained by subtracting $P_{M2}(t)$ from $P_{M2u}$, as the upper limit surplus amount component $\Delta P_{M2um}$, by using the output command value time-series data $P_{M2}(t)$ of the non-deviant generator G2, the output upper limit value $P_{M2u}$, and the following Expression (4).

[Expression 4]

$$\Delta P_{M2um} = \min\{P_{M2u} - P_{M2}(t)\} \quad (4)$$

Here, both $\Delta P_{M2lm}$ and $\Delta P_{M2um}$ are positive. Such surplus amount components are easily obtained from output command value time-series data. This makes it easy for the system operator to understand the surplus amount component. In addition, the device 10 for controlling a load frequency may use other values as the surplus amount component (surplus state and surplus amount). For example, the surplus amount component calculation unit 23 may use the controllable speed of the non-deviant generator as the surplus amount component. The above is the details of step S400.

In step S500, the output adjustment amount calculation unit 24 reads out the deviation amount component of each deviant generator from the deviation amount component calculation result data D22, into the memory 12, calculates the sum of deviation amount components of all the deviant generators, as a non-deviant generator total output adjustment amount (deviation) which is the total output adjustment amount of all the non-deviant generators, and stores it in the output adjustment amount calculation result database 44. Further, the output adjustment amount calculation unit 24 may use other values as the non-deviant generator total output adjustment amount.

In step S600, the output adjustment target determination unit 25 determines the output adjustment target, using the time-series change calculation result data D21, the deviation amount component calculation result data D22, the surplus amount component calculation result data D23, and the output adjustment amount calculation result data D24, and stores it in the output adjustment target determination result database 45. Here, details of step S600 will be described.

Figure 11:
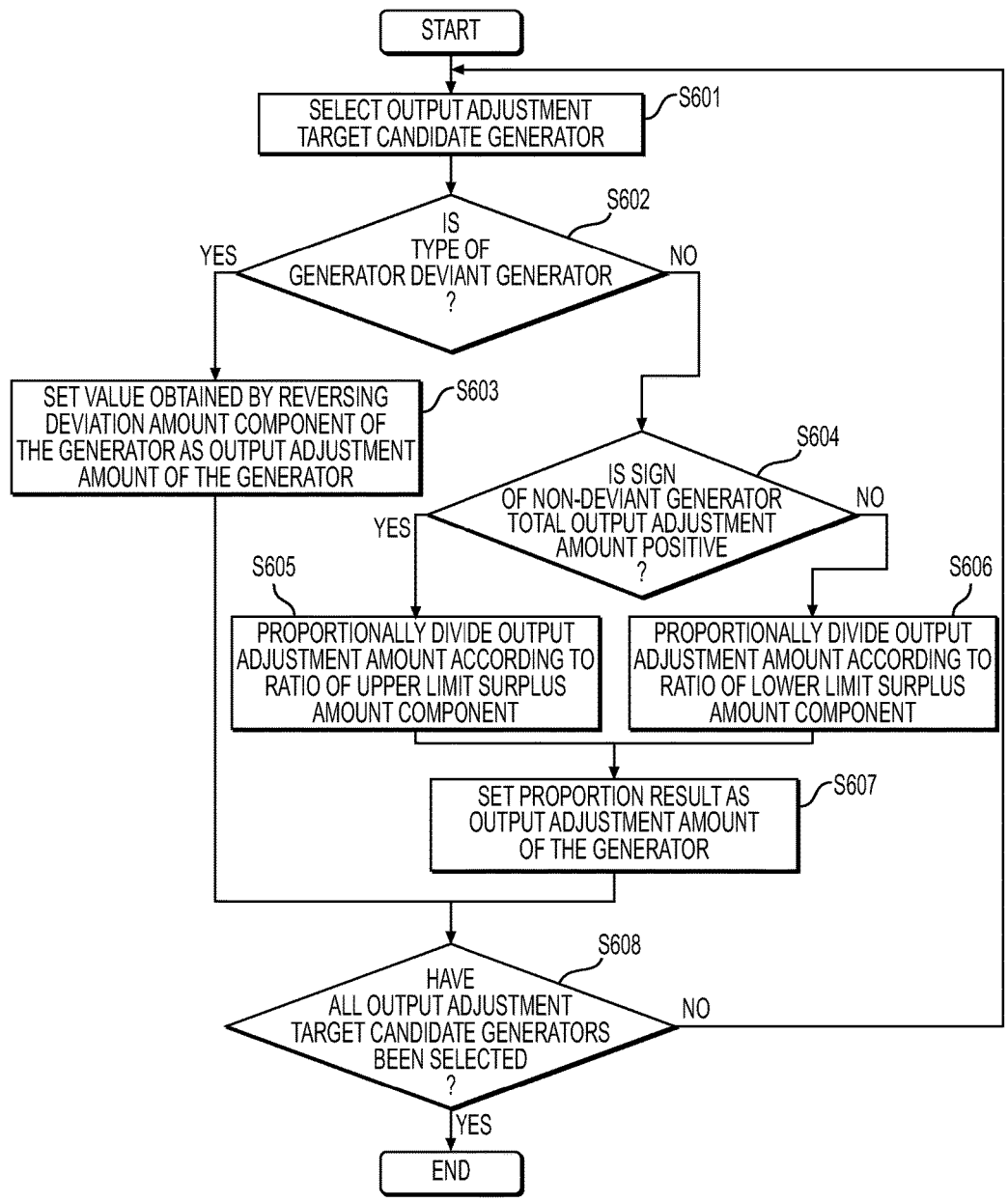
FIG. 11 shows a process of an output adjustment target determination unit 25 of Example 1.

FIG. 11 shows a process of the output adjustment target determination unit 25 of Example 1.

In step S601, the output adjustment target determination unit 25 reads the time-series change calculation result data D21, selects one generator to be controlled as the output adjustment target candidate generator in order from among generators to be controlled, and reads information indicating the output adjustment target candidate generator into the memory 12. In step S602, the output adjustment target determination unit 25 determines the type of the output adjustment target candidate generator. Here, in a case where the type of the output adjustment target generator is a deviant generator, the output adjustment target determination unit 25 proceeds to step S603. On the other hand, in a case where the type of the output adjustment target generator is a non-deviant generator, the output adjustment target determination unit 25 proceeds to step S604. In step S603, the output adjustment target determination unit 25 reads out the deviation amount component of the deviant generator from the deviation amount component calculation result data D22, into the memory 12, sets the value obtained by reversing the signs of the read deviation amount component as the output adjustment amount (the amount of adjustment) of the deviant generator, and stores it in the output adjustment target determination result database 45. In step S604, the non-deviant generator total output adjustment amount of the output adjustment amount calculation result data D24 is readout into the memory 12, and it is determined whether the sign of the non-deviant generator total output adjustment amount is positive or negative. Here, in a case where the sign is positive, the output adjustment target determination unit 25 proceeds to step S605. On the other hand, in a case where the sign is negative, the output adjustment target determination unit 25 proceeds to step S606. In step S605, the output adjustment target determination unit 25 reads out the surplus amount component calculation result data D23 into the memory 12, proportionally divides the non-deviant generator total output adjustment amount according to the ratio of the upper limit surplus amount component of the non-deviant generator, and reads it into the memory 12. In step S606, the output adjustment target determination unit 25 reads out the surplus amount component calculation result data D23, proportionally divides the non-deviant generator total output adjustment amount according to the ratio of the lower limit surplus amount component of the non-deviant generator, and reads it into the memory 12. In step S607, the output adjustment target determination unit 25 sets the proportional division amount to the non-deviant generator, among the proportion result read into the memory 12, as the output adjustment amount (the amount of adjustment) of the non-deviant generator, and stores it in the output adjustment target determination result database 45. In step S608, the output adjustment target determination unit 25 determines whether all the output adjustment target candidate generators have been selected. In a case where all the output adjustment target candidate generators have not been selected, the process returns to step S601; and in a case where all the output adjustment target candidate generators have been selected, the process is ended. The above is the details of step S600.

Thus, the device 10 for controlling a load frequency sets an output adjustment amount to cancel the deviation amount component for each deviant generator and distributes the non-deviant generator total output adjustment amount, which is the sum of deviation amount components, to the non-deviant generator, depending on the surplus amount component, thereby preventing the deviation of the output command value and the system frequency while suppressing the influence on the total output of the generators to be controlled. In other words, the device 10 for controlling a load frequency determines the sum of the output adjustment amounts of all the non-deviant generators so as to cancel the total output adjustment amount of all the deviant generators.

In addition, the output adjustment target determination unit 25 may use a surplus amount component condition that the sum of the surplus amount components of all the non-deviant power generation amounts reaches the non-deviant generator total output adjustment amount. In a case where the surplus amount component condition is not satisfied, the output adjustment target determination unit 25 may change the calculation condition and execute the steps S300 to S600 again. For example, the device 10 for controlling a load frequency may set in advance a plurality of levels with surplus for the output upper and lower limit values of each generators to be controlled. In this case, the device 10 for controlling a load frequency performs calculation by setting specific output upper and lower limit value as the calculation condition, and in a case where the surplus amount component condition is not satisfied, wider output upper and lower limit values are set as the calculation condition, and calculation is performed. Further, for example, the device 10 for controlling a load frequency may set in advance a plurality of levels with surplus, for the system frequency upper and lower limit values. In this case, the device 10 for controlling a load frequency performs calculation by setting specific system frequency upper and lower limit value as the calculation condition, and in a case where the surplus amount component condition is not satisfied, wider system frequency upper and lower limit values are set as the calculation condition, and calculation is performed.

Further, the device 10 for controlling a load frequency may calculate the output command value time-series data and the system frequency variation time-series data in a case where the output adjustment amount is applied.

Further, the device 10 for controlling a load frequency may determine whether or not time-series data deviates from the output upper limit value and also determine whether or not time-series data does not deviate from the output lower limit value, with respect to each generator to be controlled. In this case, for example, the device 10 for controlling a load frequency may calculate a deviation amount component with respect to the output upper limit value and a surplus amount component with respect to the output lower limit value, for a certain generator to be controlled.

According to the above processing, the device 10 for controlling a load frequency can easily calculate the output adjustment amount of the deviant generator from the deviation amount component of the deviant generator. Further, the device 10 for controlling a load frequency can easily calculate the output adjustment amount of the non-deviant generator, on the basis of the deviation amount component of the deviant generator and the surplus amount component of the non-deviant generator. Thus, the device 10 for controlling a load frequency can calculate the output adjustment amount at high speed, and the process can be completed even with a shorter control cycle.

Figure 12:
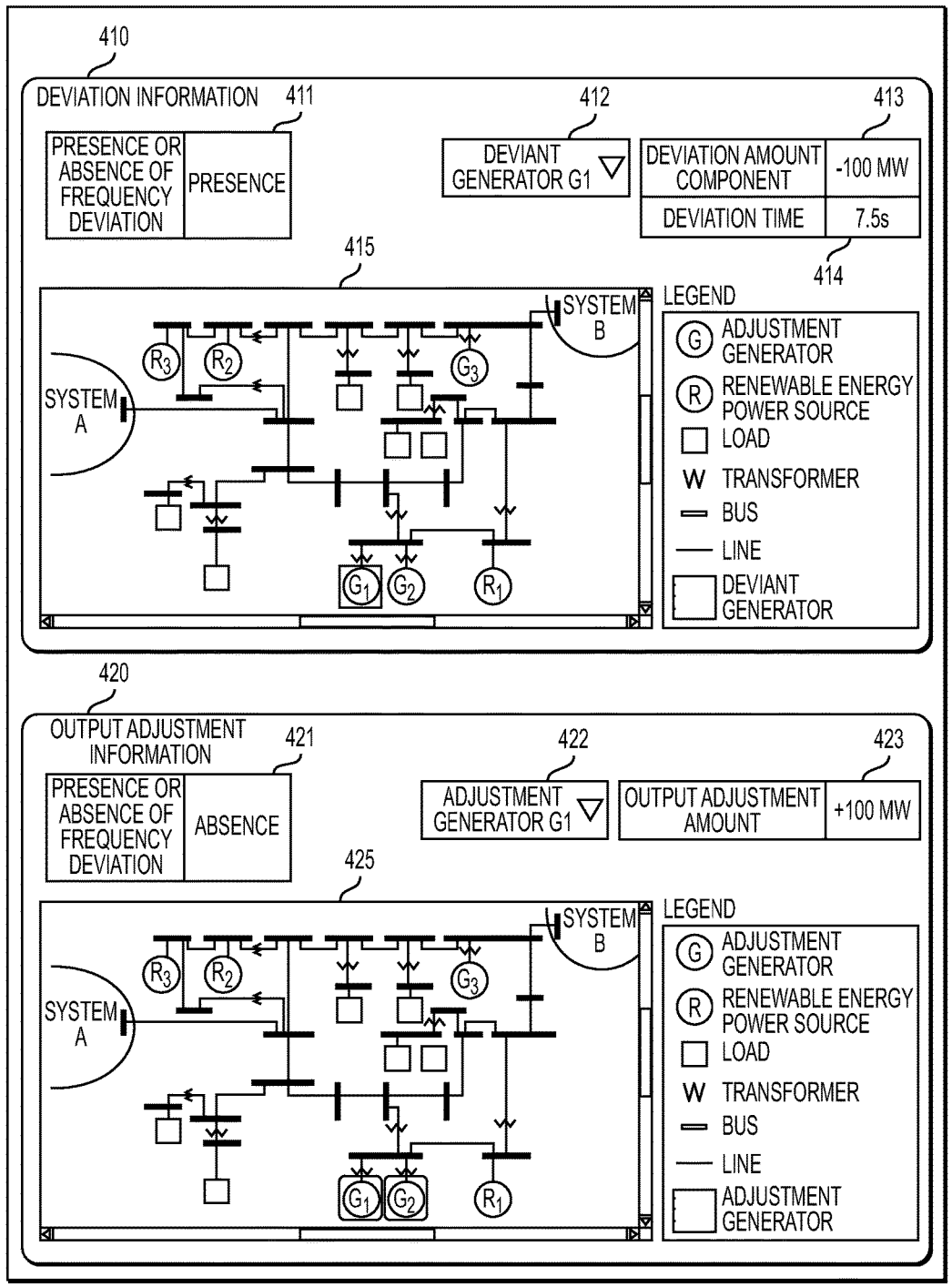
FIG. 12 shows a generator information screen of Example 1.

FIG. 12 shows a generator information screen of Example 1.

The generator information screen includes deviation information 410 and output adjustment information 420.

The deviation information 410 indicates the state before the output adjustment. The deviation information 410 includes, for example, the presence or absence 411 of deviation of the upper and lower limit values of the system frequency, a selection field 412 for receiving selection of the deviant generator, a deviation amount component 413 of the generator, a deviation time 414 at which an output command value of the generator deviates from the output upper and lower limit values, and a system diagram 415 showing the position of the generator.

The output adjustment information 420 indicates the state after the output adjustment. The output adjustment information 420 indicates, for example, the presence or absence 421 of deviation of the upper and lower limit values of the system frequency, a selection field 422 for receiving selection of an adjustment generator to be subjected to output adjustment, an output adjustment amount 423 of the generator, and a system diagram 425 showing the position of the generator.

Since such calculation results are displayed on the screen of the device 10 for controlling a load frequency or the supervisory control device 200 through the communication network 300, it is possible to know at a glance a generator, a time and a deviation amount component that the generator deviates, and a generator and an extent that the generator is to be adjusted, in the power system 100.

Figure 13:
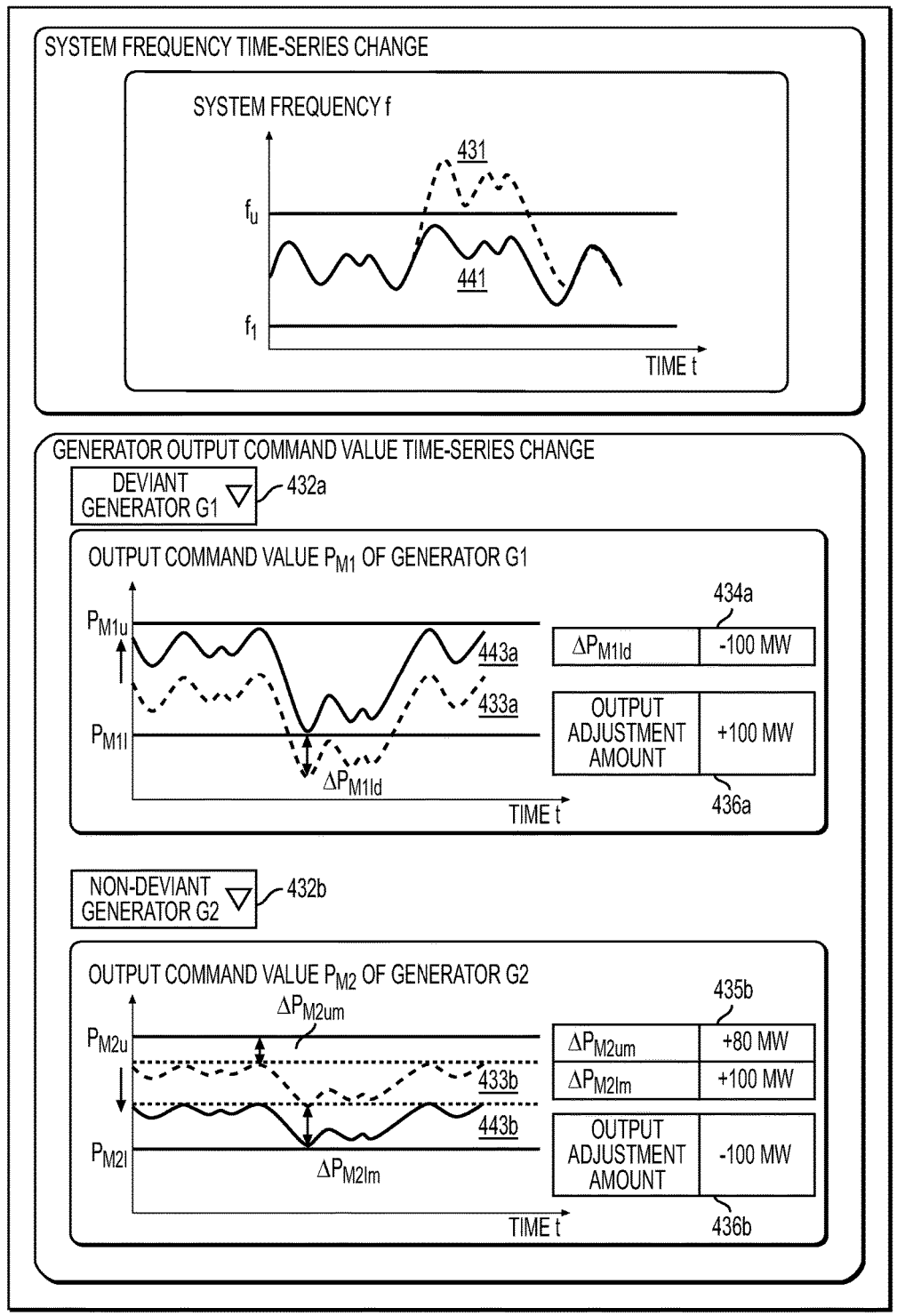
FIG. 13 shows a time-series data screen of Example 1.

FIG. 13 shows a time-series data screen of Example 1.

The time-series data screen shows time-series data before the output adjustment and time-series data after the output adjustment. On the time-series data screen, for example, time-series data screen displays a system frequency variation time-series data 431 (broken line) before the output adjustment, a system frequency variation time-series data 441 (solid line) after the output adjustment, a selection field 432a for receiving selection of the generator to be controlled, an output command value time-series data 433a (broken line) of the generator before the output adjustment, a deviation amount component 434a in a case where the generator is a deviant generator, an output adjustment amount 436a of the generator, an output command value time-series data 443a (solid line) of the generator after the output adjustment, a selection field 432b for receiving selection of another generator to be controlled, an output command value time-series data 433b (broken line) of the generator before the output adjustment, a surplus amount component 435b in a case where the generator is a non-deviant generator, an output adjustment amount 436b of the generator, and an output command value time-series data 443b (solid line) of the generator after the output adjustment are displayed.

According to this example, it is known that the output command value time-series data 443a after the output adjustment of the deviant generator G1 does not deviate from the output upper and lower limit values, and the system frequency variation time-series data 441 after the output adjustment deviates from the system frequency upper and lower limit values.

Since the calculation results such as the time-series information screen are displayed on the screen of the device 10 for controlling a load frequency or the supervisory control device 200 through the communication network 300, it is possible to know at a glance, a time and a deviation amount component that the deviant generator in the power system 100 has, or a time and a surplus amount component that the non-deviant generator has. Further, in a case where there are a plurality of deviant generators or non-deviant generators, the system operator can select through the selection fields 432a and 432b, a generator, and check a time-series change calculation result, a deviation amount component calculation result, a surplus amount component calculation result, with respect to the selected generator.

Example 2

In the present example, an example of a device for controlling a load frequency is described in which deviation amount component calculation, surplus amount component calculation, output adjustment amount calculation, and output adjustment target determination are performed by using the frequency spectrum calculation result data calculated by the frequency spectrum calculation, thereby improving the output adjustment possibility.

Figure 14:
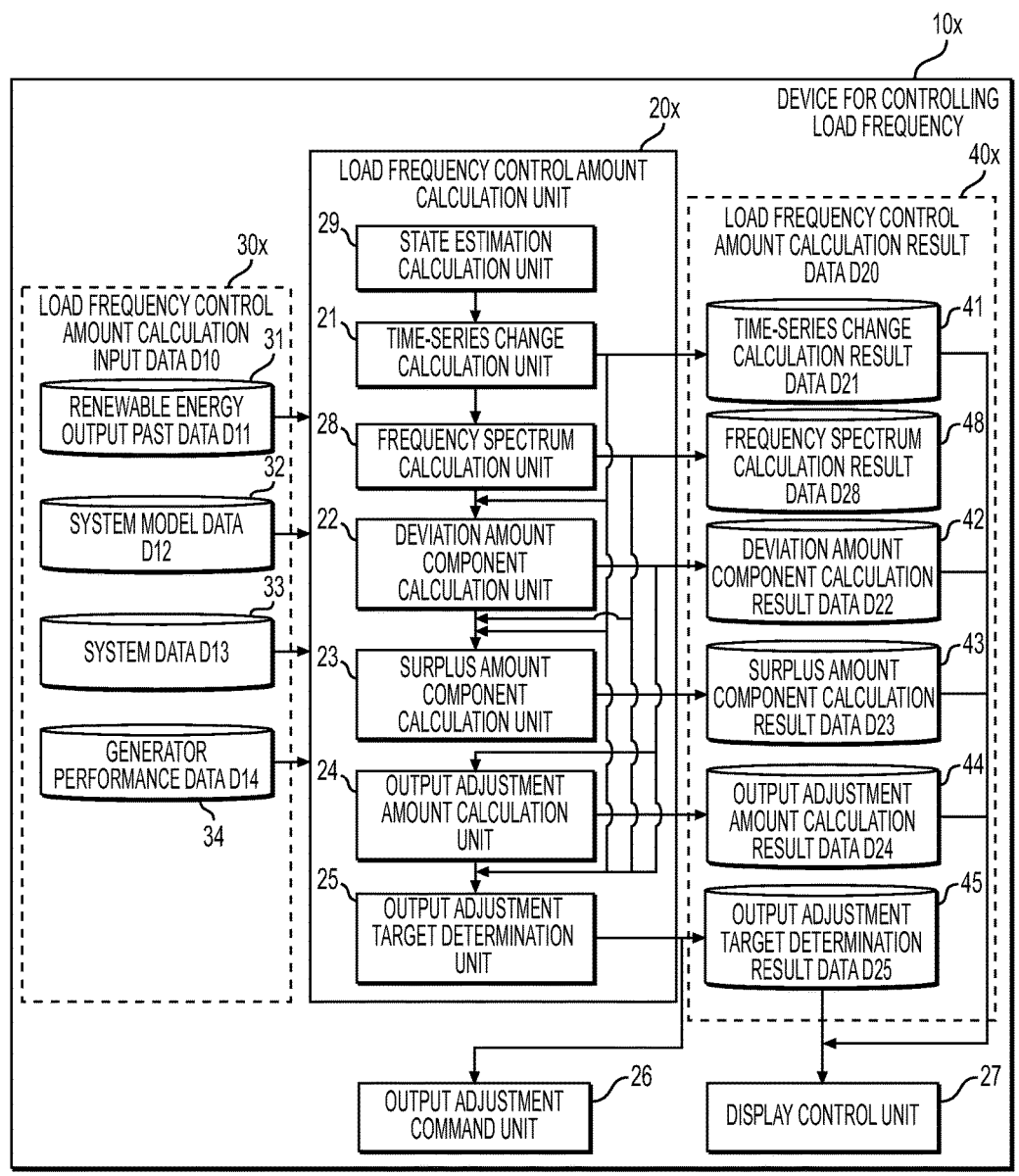
FIG. 14 shows a functional configuration of a device 10x for controlling a load frequency of Example 2.

FIG. 14 shows a functional configuration of a device 10x for controlling a load frequency of Example 2.

The device 10x for controlling a load frequency includes a load frequency control amount calculation input database 30x including a renewable energy output past database 31, a system model database 32, a system database 33, and a generator performance database 34; a load frequency control amount calculation unit 20x including a state estimation calculation unit 29, a time-series change calculation unit 21, a frequency spectrum calculation unit 28, a deviation amount component calculation unit 22, a surplus amount component calculation unit 23, an output adjustment amount calculation unit 24, and an output adjustment target determination unit 25; a load frequency control amount calculation result database 40x including a time-series change calculation result database 41, a frequency spectrum calculation result database 48, a deviation amount component calculation result database 42, a surplus amount component calculation result database 43, an output adjustment amount calculation result database 44, and an output adjustment target determination result database 45; an output adjustment command unit 26; and a display control unit 27.

The load frequency control amount calculation input data D10 which is input to the load frequency control amount calculation input database 30x includes renewable energy output past data D11, system model data D12, system data D13, and generator performance data D14. The time-series change calculation unit 21 performs time-series change calculation by using the renewable energy output past data D11, the system model data D12, and the system data D13, and outputs the time-series change calculation result data D21. The frequency spectrum calculation unit 28 performs frequency spectrum calculation by using the time-series change calculation result data D21, and outputs the frequency spectrum calculation result data D28. The deviation amount component calculation unit 22 performs deviation amount component calculation by using the generator performance data D14, the time-series change calculation result data D21, and the frequency spectrum calculation result data D28, and outputs the deviation amount component calculation result data D22. The surplus amount component calculation unit 23 perform surplus amount component calculation by using the time-series change calculation result data D21, the frequency spectrum calculation result data D28, and the deviation amount component calculation result data D22, and outputs the surplus amount component calculation result data D23. The output adjustment amount calculation unit performs output adjustment amount calculation by using the deviation amount component calculation result data D22, and outputs the output adjustment amount calculation result data D24. The output adjustment target determination unit 25 determines the output adjustment target by using the time-series change calculation result data D21, the deviation amount component calculation result data D22, the surplus amount component calculation result data D23, and the output adjustment amount calculation result data D24, and outputs the output adjustment target determination result data D25. The output adjustment command unit 26 transmits the output adjustment command to the output adjustment target by using the output adjustment target determination result data D25. The display control unit 27 uses the load frequency control amount calculation result data D20 to display the information of each calculation result on the display device.

Figure 15:
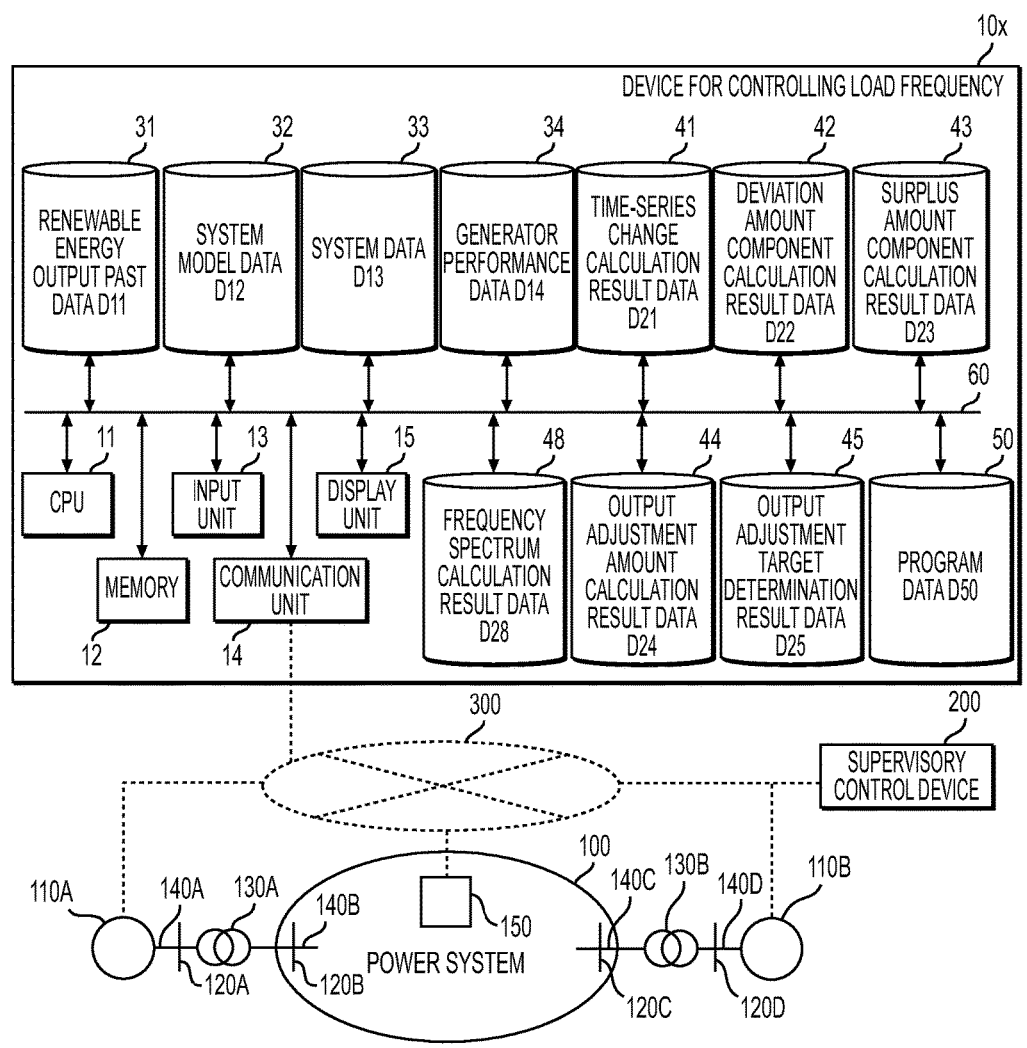
FIG. 15 shows a hardware configuration of the device 10x for controlling a load frequency and a power system of Example 2.

FIG. 15 shows a hardware configuration of the device 10x for controlling a load frequency and a power system of Example 2.

In this example, the elements denoted by the same reference numerals as those of Example 1 are the same as or equivalent to the elements of Example 1, and the description thereof is omitted. The device 10x for controlling a load frequency of the present example includes a frequency spectrum calculation result data D28 in addition to the elements of the device 10 for controlling a load frequency of Example 1.

The device 10x for controlling a load frequency includes a display unit 15, an input unit 13 such as a keyboard and a mouse, a communication unit 14, a computer or computer server (CPU: Central Processing Unit) 11, a memory 12, and various databases (the renewable energy output past database 31, the system model database 32, the system database 33, the generator performance database 34, the time-series change calculation result database 41, the frequency spectrum calculation result database 48, the deviation amount component calculation result database 42, the surplus amount component calculation result database 43, the output adjustment amount calculation result database 44, the output adjustment target determination result database 45, and the program database 50). Each of these units is connected to the bus line 60.

Figure 16:
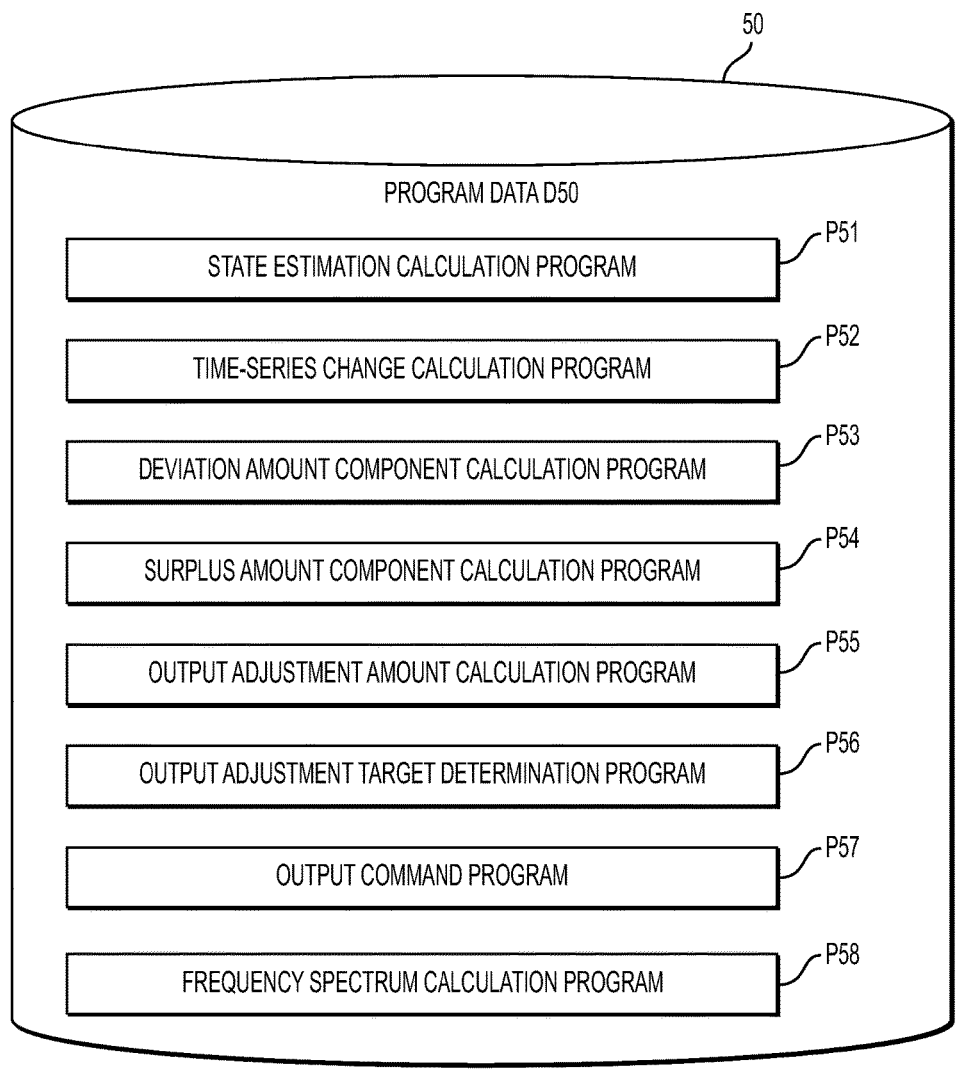
FIG. 16 shows stored contents of a program database 50 of Example 2.

FIG. 16 shows stored contents of the program database 50 of Example 2.

In the program database 50, for example, a state estimation calculation program P51, a time-series change calculation program P52, a frequency spectrum calculation program P58, a deviation amount component calculation program P53, a surplus amount component calculation program P54, an output adjustment amount calculation program P55, an output adjustment target determination program P56, and an output command program P57 are stored as a calculation program (program data D50).

The CPU 11 executes the calculation program read out from the program database 50 into the memory 12 to calculate a plausible system state, calculate a time-series change, calculate a frequency spectrum, calculate a deviation amount component, calculate a surplus amount component, calculate an output adjustment amount, determine an output adjustment target, give a command of an output adjustment amount, give an instruction of image data to be displayed, retrieve data in various databases, and the like.

Eleven databases are roughly stored in the device 10x for controlling a load frequency. Hereinafter, excluding the program database 50, and the system model database 32 and the generator performance database 34, which have already been described, a description will be given about the renewable energy output past database 31, the time-series change calculation result database 41, the frequency spectrum calculation result database 48, the deviation amount component calculation result database 42, the surplus amount component calculation result database 43, the output adjustment amount calculation result database 44, and the output adjustment target determination result database 45.

FIG. 17 shows renewable energy output past data D11 of Example 2.

The renewable energy output past database 31 includes, as the renewable energy output past data D11, a renewable energy output spectrum which is a frequency spectrum of the output of a renewable energy generator such as a solar power generator or a wind power generator in a specific past period. That is, in the present example, the case where the renewable energy output past data D11 is not the time-series data but the frequency spectrum will be described.

The time-series change calculation result database 41 includes time-series change calculation result data D21 calculated by the time-series change calculation program P52, using the renewable energy output past data D11, the system model data D12, and the system data D13. The time-series change calculation result data D21 is, for example, system frequency variation time-series data, output command value time-series data, or the like as in Example 1. Details of a method of calculating the time-series change will be described later.

The frequency spectrum calculation result database 48 includes the frequency spectrum calculation result data D28 calculated by the frequency spectrum calculation program P58 using the time-series change calculation result data D21. The frequency spectrum calculation result data D28 includes, for example, the frequency spectrum (system frequency variation spectrum) of a system frequency variation, the frequency spectrum (output command value spectrum) of the output command value of the generator, or the like. Details of the frequency spectrum calculation method will be described later.

The deviation amount component calculation result database 42 includes the deviation amount component calculation result data D22 calculated by the deviation amount component calculation program P53, by using the time-series change calculation result data D21, the frequency spectrum calculation result data D28, and the generator performance data D14. The deviation amount component calculation result data D22 is, for example, a deviation amount component which is a set of the maximum value of the frequency component and its frequency, among the output command value spectra of the deviant generator. Details of a method of calculating the deviation amount component will be described later.

The surplus amount component calculation result database 43 includes the surplus amount component calculation result data D23 calculated by the surplus amount component calculation program P54 using the time-series change calculation result data D21, the frequency spectrum calculation result data D28, and the deviation amount component calculation result data D22. The surplus amount component calculation result data D23 is, for example, a surplus amount component which is a set of the reciprocal of the frequency component at the frequency of the deviation amount component and its frequency, among the output command value spectra of the non-deviant generator. Details of a method of calculating the surplus amount component will be described later.

The output adjustment amount calculation result database 44 includes the result calculated by the output adjustment amount calculation program P55 using the deviation amount component calculation result data D22. A method of calculating the output adjustment amount will be described later.

The output adjustment target determination result database 45 includes the output adjustment amount calculation result data D24 calculated by the output adjustment target determination program P56 using the time-series change calculation result data D21, the deviation amount component calculation result data D22, the surplus amount component calculation result data D23, and the output adjustment amount calculation result data D24. A method of determining the output adjustment target will be described later.

The process of the device 10*x* for controlling a load frequency will be described below.

Figure 18:
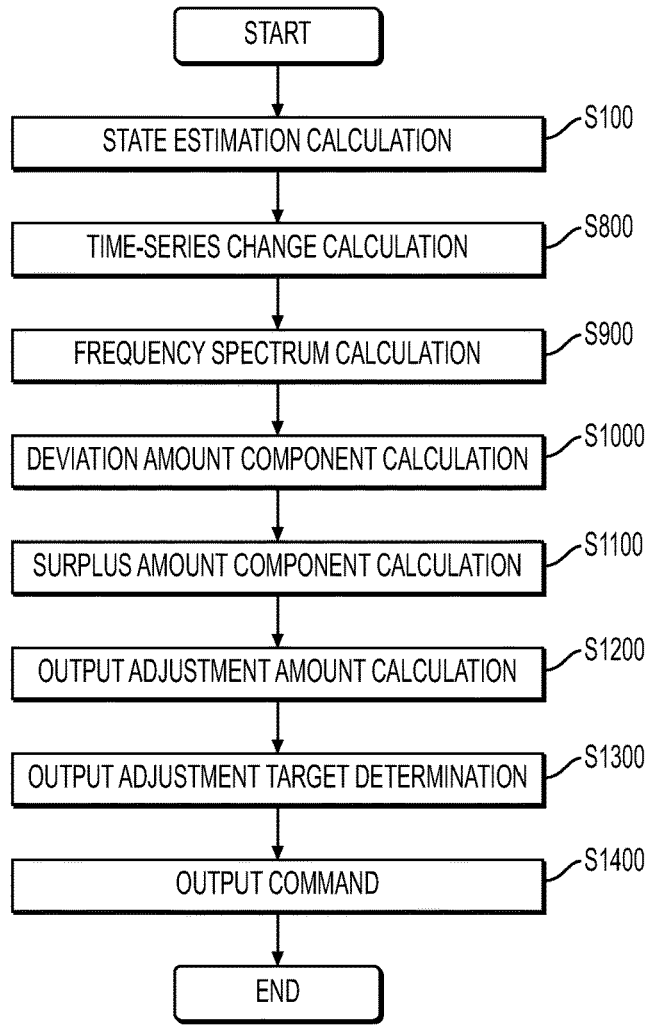
FIG. 18 shows a process of the device 10x for controlling a load frequency of Example 2.

FIG. 18 shows a process of the device 10*x* for controlling a load frequency of Example 2.

In step S100, the state estimation calculation unit 29 performs state estimation calculation, using the system model data D12 and the system data D13. Next, in step S800, the time-series change calculation unit 21 calculates a time-series change by using the state estimation result, the renewable energy output past data D11, and the system model data D12. Next, in step S900, the frequency spectrum calculation unit 28 calculates a frequency spectrum by using the time-series change calculation result data D21. Next, in step S1000, the deviation amount component calculation unit 22 performs deviation amount component calculation by using the time-series change calculation result data D21, the frequency spectrum calculation result data D28, and the generator performance data D14. Next, in step S1100, the surplus amount component calculation unit 23 performs surplus amount component calculation by using the time-series change calculation result data D21, the frequency spectrum calculation result data D21, and the deviation amount component calculation result data D22. Next, in step S1200, the output adjustment amount calculation unit 24 performs output adjustment amount calculation by using the deviation amount component calculation result data D22. Next, in step S1300, the output adjustment target determination unit 25 determines an output adjustment target by using the time-series change calculation result data D21, the deviation amount component calculation result data D22, the surplus amount component calculation result data D23, and the output adjustment amount calculation result data D24. Finally, in step S1400, the output adjustment command unit 26 issues an output command to an output adjustment target, by using the output adjustment target determination result data D25.

Various calculation results and data accumulated in the memory during the calculation may be sequentially displayed on the screen of the supervisory control device 200. Thereby, the operator can easily recognize the operating situation of the device 10 for controlling a load frequency. The details of the above process will be described step by step.

In step S800, the time-series change calculation unit 21 performs time-series change calculation by using the state estimation result obtained in step S100, the renewable energy output past data D11, and the system model data D12, and stores the calculation result in the time-series change calculation result database 41. Here, details of step S800 will be described.

Figure 19:
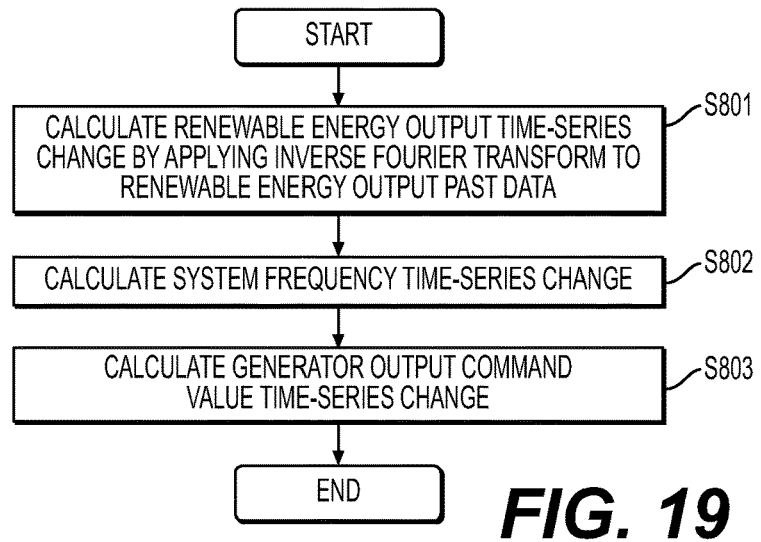
FIG. 19 shows a process of a time-series change calculation unit 21 of Example 2.

FIG. 19 shows a process of a time-series change calculation unit 21 of Example 2.

In step 801, the time-series change calculation unit 21 calculates renewable energy output time-series data by applying inverse Fourier transform to the renewable energy output past data D11. In step S802, the time-series change calculation unit 21 calculates system frequency variation time-series data by using the state estimation result obtained in step S100, the system model data D12, and the renewable energy output time-series data obtained in step S801. In step S803, the time-series change calculation unit 21 calculates output command value time-series data by using the state estimation result obtained in step S100, the system model data D12, and the renewable energy output time-series data obtained in step S801. As a method of calculating each time-series change, for example, a known method is used. The above is the details of step S800.

In step S900, the frequency spectrum calculation unit performs frequency spectrum calculation by using the time-series change calculation result, and stores the calculation result in the frequency spectrum calculation result database 48. Here, details of step S900 will be described.

Figure 20:
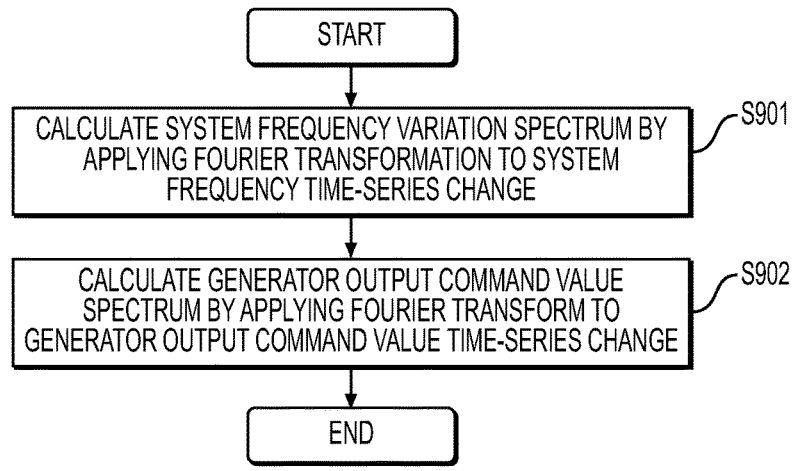
FIG. 20 shows a process of a frequency spectrum calculation unit 28 of Example 2.

FIG. 20 shows a process of the frequency spectrum calculation unit 28 of Example 2.

In step S901, the frequency spectrum calculation unit 28 reads out the system frequency variation time-series data from the time-series change calculation result data D21, into the memory 12, and calculates the system frequency variation spectrum by applying Fourier transformation thereto. In step S902, the frequency spectrum calculation unit 28 reads out the output command value time-series data of the generator to be controlled, from the time-series change calculation result data D21, into the memory 12, and calculates the output command value spectrum (frequency spectrum) by applying Fourier transform thereto. The above is the details of step S900.

In step S1000, the deviation amount component calculation unit 22 calculates a deviation amount component by using the time-series change calculation result data D21, the frequency spectrum change calculation result, and the generator performance data D14, and stores the calculation result in the deviation amount component calculation result database 42. Here, details of step S1000 will be described.

Figure 21:
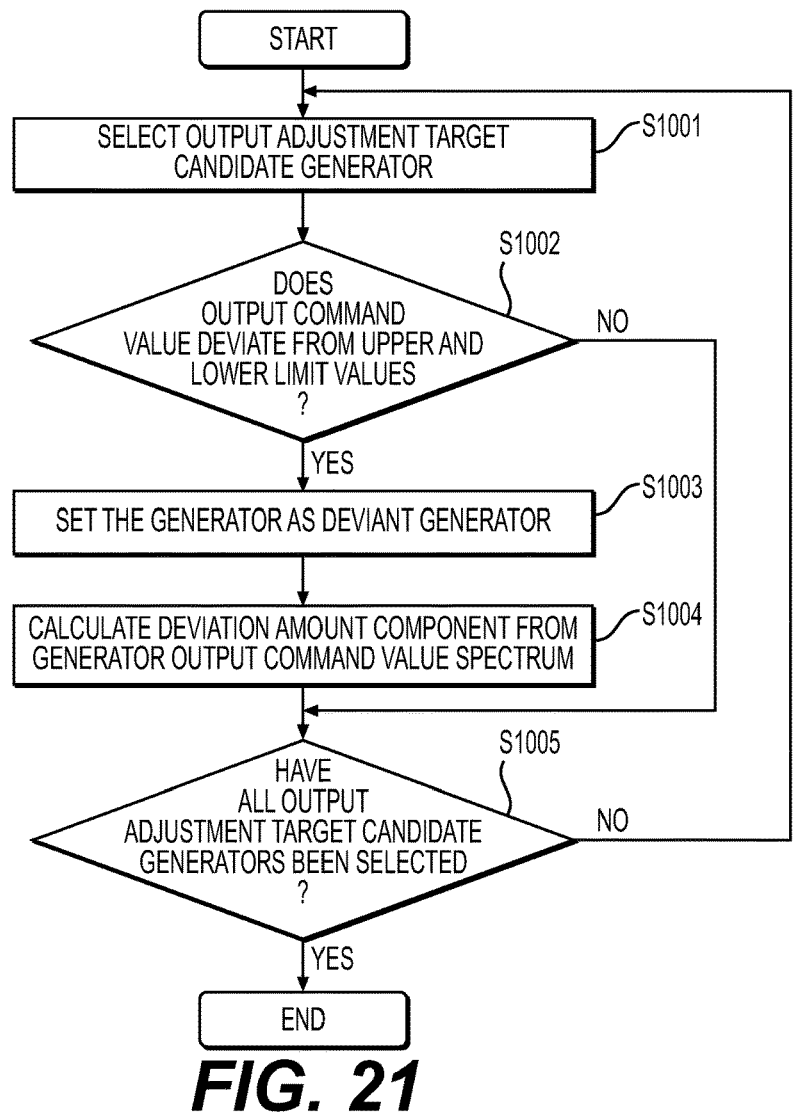
FIG. 21 shows a process of a deviation amount component calculation unit 22 of Example 2.

FIG. 21 shows a process of a deviation amount component calculation unit 22 of Example 2.

In step S1001, the deviation amount component calculation unit 22 reads out the time-series change calculation result data D21, selects one output adjustment target candidate generator in order from among generators to be controlled, and reads the output command value time-series data of the output adjustment target candidate generator into the memory 12. In step S1002, the deviation amount component calculation unit 22 reads out the output upper and lower limit values of the output adjustment target candidate generator, from the generator performance database 34, into the memory 12, and determines whether the output command value deviates from the output upper and lower limit values, using the output command value time-series data and the output upper and lower limit values of the output adjustment target candidate generator. Here, in a case where the output command value deviates from the output upper and lower limit values, the deviation amount component calculation unit 22 proceeds to step S1003. On the other hand, in a case where the output command value does not deviate from the output upper and lower limit values, the deviation amount component calculation unit 22 proceeds to step S1005. In step S1003, the deviation amount component calculation unit 22 sets the output adjustment target candidate generator as a deviant generator, and saves the setting contents in the time-series change calculation result database 41. In step S1004, the deviation amount component calculation unit 22 reads out the output command value spectrum of the output adjustment target candidate generator, from the frequency spectrum calculation result database 48, into the memory 12, selects a set of an influence amount (deviation state) which is the maximum frequency component and the influence frequency which is the frequency thereof, from among output command value spectra, and stores it as the deviation amount component in the deviation amount component calculation result database 42. In step S1005, the deviation amount component calculation unit 22 determines whether all the output adjustment target candidate generators have been selected. In a case where all the output adjustment target candidate generators have not been selected, the process returns to step S1001; and in a case where all the output adjustment target candidate generators have been selected, the process is ended.

Figure 22A:
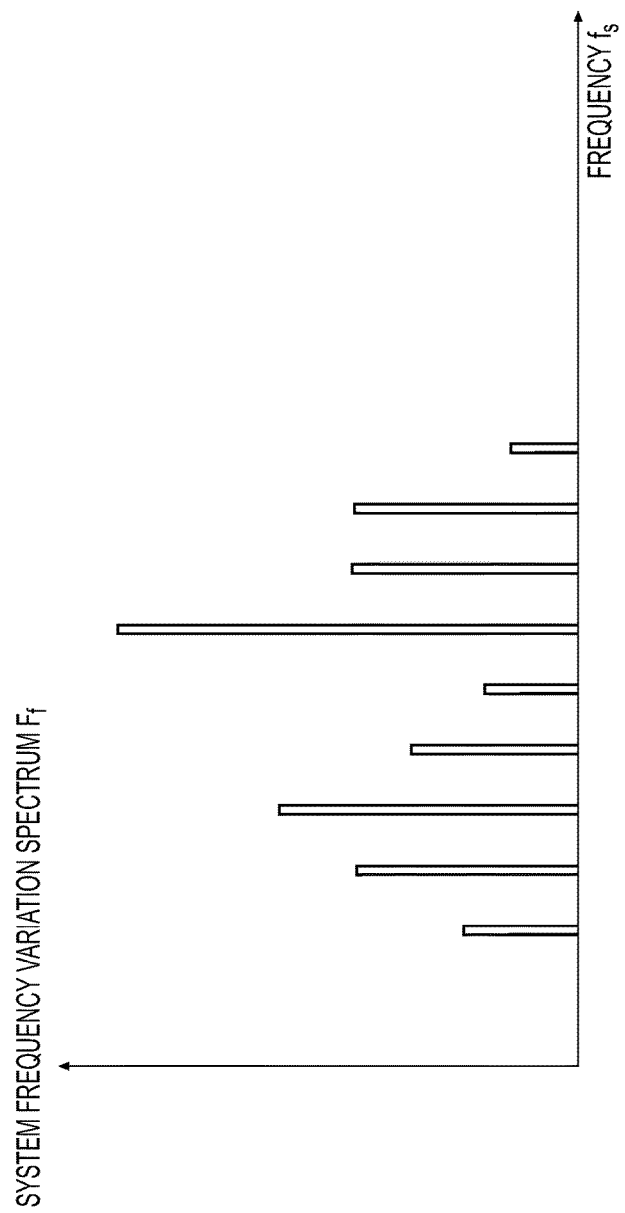
FIGS. 22A, 22B, and 22C show frequency spectrum calculation result data D28 of Example 2.
Figure 22B:
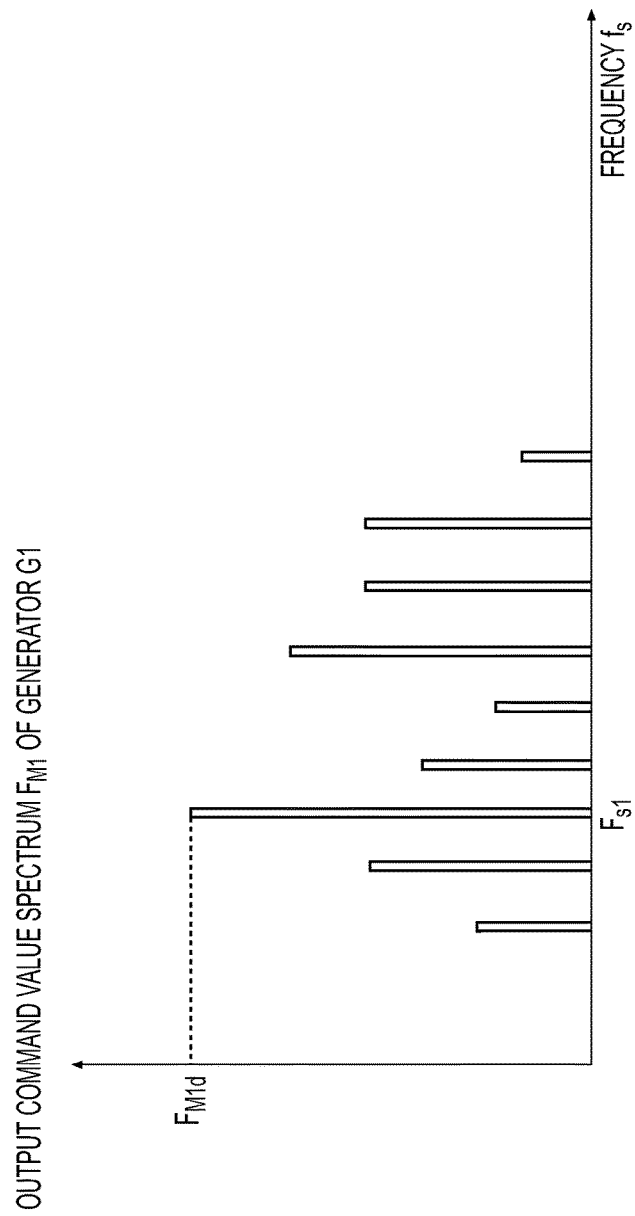
Figure 22C:
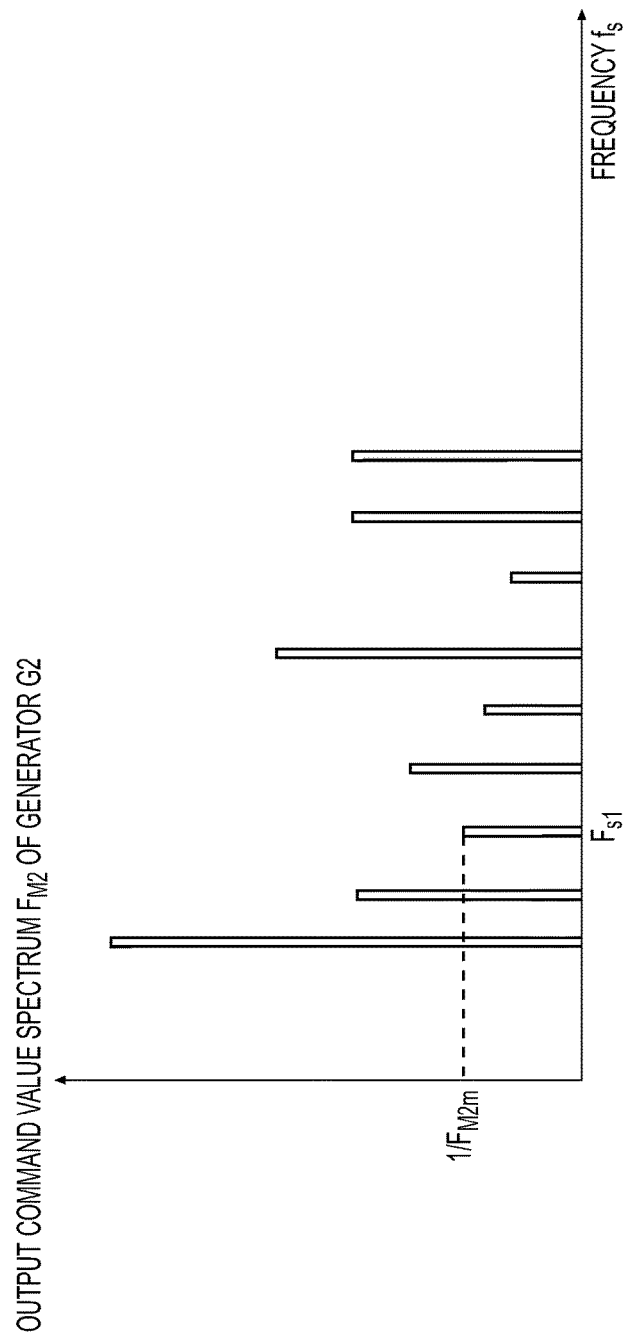

FIG. 22 shows frequency spectrum calculation result data D28 of Example 2.

Here, the frequency spectrum calculation result data D28 includes the system frequency variation spectrum $F_f(f_s)$, the output command value spectrum $F_{M1}(f_s)$ of the generator G1 to be controlled, and the output command value spectrum $F_{M2}(f_s)$ of the generator G2 to be controlled, which are predicted for the control period. Here, the generator G1 to be controlled is determined as a deviant generator, on the basis of the output command value time-series data $P_{M1}(t)$, similarly to Example 1. Further, in the output command value spectrum of the deviant generator G1, the influence amount $F_{M1d}$, which is the maximum frequency component, and the corresponding influence frequency $f_{s1}$ are shown.

Using the following Expressions 5 and 6, the deviation amount component calculation unit 22 calculates a set of the influence amount $F_{M1d}$ and the corresponding influence frequency $f_{s1}$, of the frequency component of the output command value spectrum $F_{M1}$ of the deviant generator G1, as the deviation amount component ($F_{M1d}$, $f_{s1}$).

[Expression 5]

$$F_{M1d}=\max(F_{M1}(f_s)) \quad (5)$$

[Expression 6]

$$f_{s1}=\arg(\max(F_{M1}(f_s))) \quad (6)$$

Such a deviation amount component can be easily obtained from the frequency spectrum. This makes it easy for the system operator to understand the deviation amount component. In addition, the deviation amount component calculation unit 22 may calculate and use other components as the deviation amount component. Further, since there is a case where the deviation amount component is not present depending on the renewable energy output past data, the system data, and the system model data. In such a case, it is determined that there is no deviation amount component, and the process proceeds to step S1005. The above is the details of step S1000.

In step S1100, the surplus amount component calculation unit 23 calculates the surplus amount component by using the time-series change calculation result data D21 and the deviation amount component calculation result data D22, and stores it in the surplus amount component calculation result database 43. Here, details of step S1100 will be described.

Figure 23:
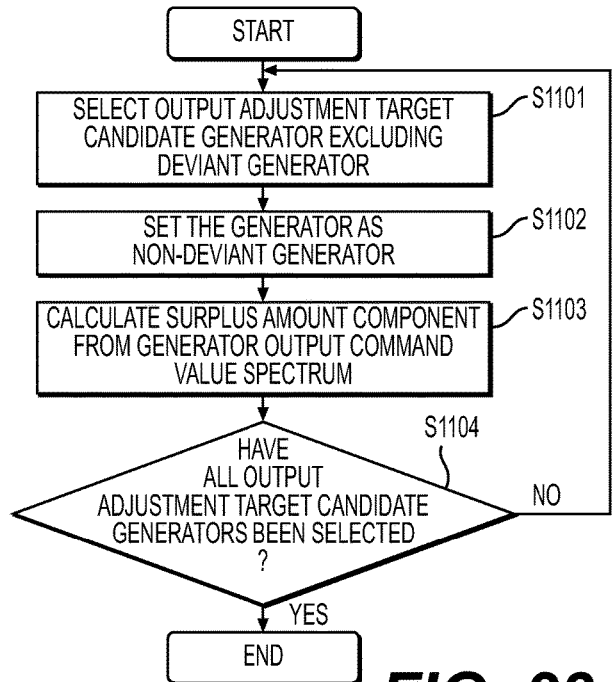
FIG. 23 shows a process of a surplus amount component calculation unit 23 of Example 2.

FIG. 23 shows a process of the surplus amount component calculation unit 23 of Example 2.

In step S1101, the surplus amount component calculation unit 23 reads out the time-series change calculation result data D21, selects one generator to be controlled as the output adjustment target candidate generator in order, excluding the deviant generator, from among generators to be controlled, and reads information indicating the output adjustment target candidate generator into the memory 12. In step S1102, the surplus amount component calculation unit 23 sets the output adjustment target candidate generator as a non-deviant generator, and saves the setting contents in the time-series change calculation result database 41. In step S1103, the surplus amount component calculation unit 23 reads out the deviation amount component from the deviation amount component calculation result database 42, into the memory 12, reads the output command value spectrum of the output adjustment target candidate generator, from the frequency spectrum calculation result database 48, into the memory 12, calculates the frequency component of the influence frequency among the output command value spectrum of the output adjustment target candidate generator as the target amount, calculates the reciprocal of the target amount as a surplus amount, and stores a set of the surplus amount and the influence frequency as the surplus amount component in the surplus amount component calculation result database 43. In step S1104, the surplus amount component calculation unit 23 determines whether all the output adjustment target candidate generators excluding the deviant generator have been selected. In a case where all the output adjustment target candidate generators have not been selected, the process returns to step S1101; and in a case where all the output adjustment target candidate generators have been selected, the process is ended.

In the aforementioned FIG. 22, the generator G2 to be controlled is determined to be a non-deviant generator.

The surplus amount component calculation unit 23 calculates a surplus amount $F_{m2m}$ from the target amount $F_{M2}(f_{s1})$ which is the magnitude of the frequency component of the influence frequency, by using the output command value spectrum $F_{M2}$ of the non-deviant generator G2, the influence frequency $f_{s1}$, and the following equation (7), and sets a set of a surplus amount and the influence frequency as the surplus amount component ($F_{M2m}$, $f_{s1}$).

[Expression 7]

$$F_{M2m}=1/F_{M2}(f_{s1}) \quad (7)$$

Such surplus amount components are easily obtained from the output command value spectrum. This makes it easy for the system operator to understand the surplus amount component. Further, the surplus amount component calculation unit 23 may use other components as the surplus amount component. The above is the details of step S1100.

In step S1200, the output adjustment amount calculation unit 24 reads out the deviation amount component of each deviant generator, from the deviation amount component calculation result data D22, into the memory 12, calculates the sum of the influence amount of the deviation amount component of each deviant generator, as a non-deviant generator total output adjustment amount which is the sum of the output adjustment amounts of the non-deviant generators, and stores it in the output adjustment amount calculation result database 44. Further, the output adjustment amount calculation unit 24 may use other values as the non-deviant generator total output adjustment amount.

In step S1300, the output adjustment target determination unit 25 determines the output adjustment target, using the time-series change calculation result data D21, the deviation amount component calculation result data D22, the surplus amount component calculation result data D23, and the output adjustment amount calculation result data D24, and stores it in the output adjustment target determination result database 45. Here, details of step S1300 will be described.

Figure 24:
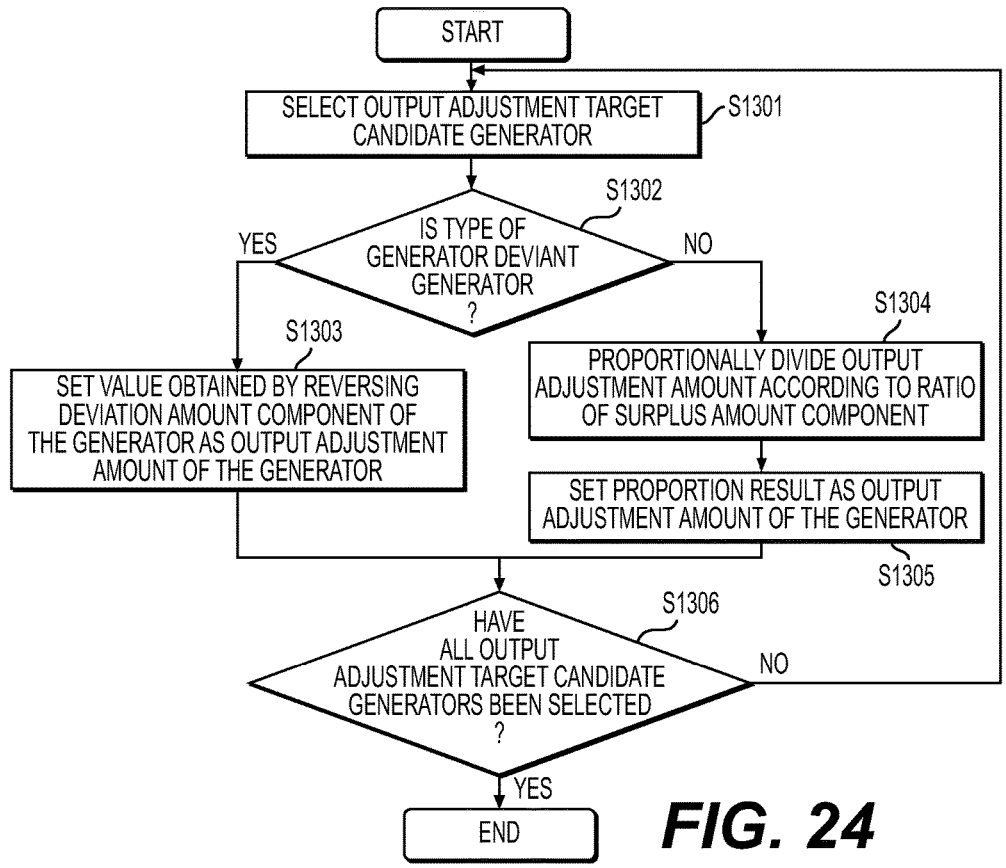
FIG. 24 shows a process of an output adjustment target determination unit 25 of Example 2.

FIG. 24 shows a process of the output adjustment target determination unit 25 of Example 2.

In step S1301, the output adjustment target determination unit 25 reads out the time-series change calculation result data D21, selects one generator to be controlled as the output adjustment target candidate generator in order from among generators to be controlled, and reads information indicating the output adjustment target candidate generator into the memory 12. In step S1302, the type of the output adjustment target generator is determined. Here, in a case where the type of the generator is the deviant generator, the process proceeds to step S1303. On the other hand, in a case where the type of the generator is a non-deviant generator, the output adjustment target determination unit 25 proceeds to step S1304. In step S1303, the output adjustment target determination unit 25 reads out the deviation amount component of the deviant generator, from the deviation amount component calculation result data D22, into the memory 12, sets a value obtained by reversing the sign of the influence amount $F_{M1d}$ of the read deviation amount component as the output adjustment amount of the deviant generator, and stores the setting contents in the output adjustment target determination result database 45. In step S1304, the output adjustment target determination unit 25 reads out the surplus amount component calculation result data D23 and the output adjustment amount calculation result data D24 into the memory 12, and proportionally divides the non-deviant generator total output adjustment amount according to the ratio of the surplus amount of the non-deviant generator. In step S1305, the output adjustment target determination unit 25 sets the proportion result as the output adjustment amount of the non-deviant generator, and stores it in the output adjustment target determination result database 45. In step S1306, the output adjustment target determination unit 25 determines whether all the output adjustment target candidate generators have been selected. In a case where all the output adjustment target candidate generators have not been selected, the process returns to step S1301; and in a case where all the output adjustment target candidate generators have been selected, the process is ended. The above is the details of step S1300.

In a case where a plurality of deviant generators and a plurality of influence frequencies are detected, the device 10x for controlling a load frequency may calculate the non-deviant generator total output adjustment amount, the surplus amount component of the non-deviant generator, and the output adjustment amount of the non-deviant generator, for each of the influence frequencies.

Instead of the output upper and lower limit values, the upper limit value of each frequency component may be set in advance. In this case, the device 10 for controlling a load frequency determines whether or not each frequency component deviates from the upper limit value and compares each frequency component of the output command value spectrum with the upper limit value to calculate the deviation amount component and the surplus amount component.

The device 10x for controlling a load frequency removes the component of the influence frequency giving the greatest influence on the deviation, from the output command value spectrum of the deviant generator, distributes the non-deviant generator total output adjustment amount which is the sum of the magnitude of the deviation amount component, according to the magnitude of the surplus amount component, to the non-deviant generators, and adds the component of the influence frequency of the non-deviant generator, thereby suppressing the influence on the total output of the generators to be controlled, and preventing the deviation of the output command value and the system frequency. In other words, the device 10x for controlling a load frequency determines the sum of the output adjustment amounts of the components of the influence frequency of all the non-deviant generators so as to cancel the total output adjustment amount of the components of the influence frequency of all the deviant generators.

In step S1400, the output adjustment command unit 26 transmits a command indicating the output adjustment amount of the component of the influence frequency among the output command value spectra, to each deviant generator.

According to the above processing, the device 10x for controlling a load frequency can easily calculate the output adjustment amount of the deviant generator from the deviation amount component of the deviant generator. Further, the device 10 for controlling a load frequency can easily calculate the output adjustment amount of the non-deviant generator, on the basis of the deviation amount component of the deviant generator and the surplus amount component of the non-deviant generator. Thus, the device 10 for controlling a load frequency can calculate the output adjustment amount at high speed, and the process can be completed even with a shorter control cycle.

Figure 25:
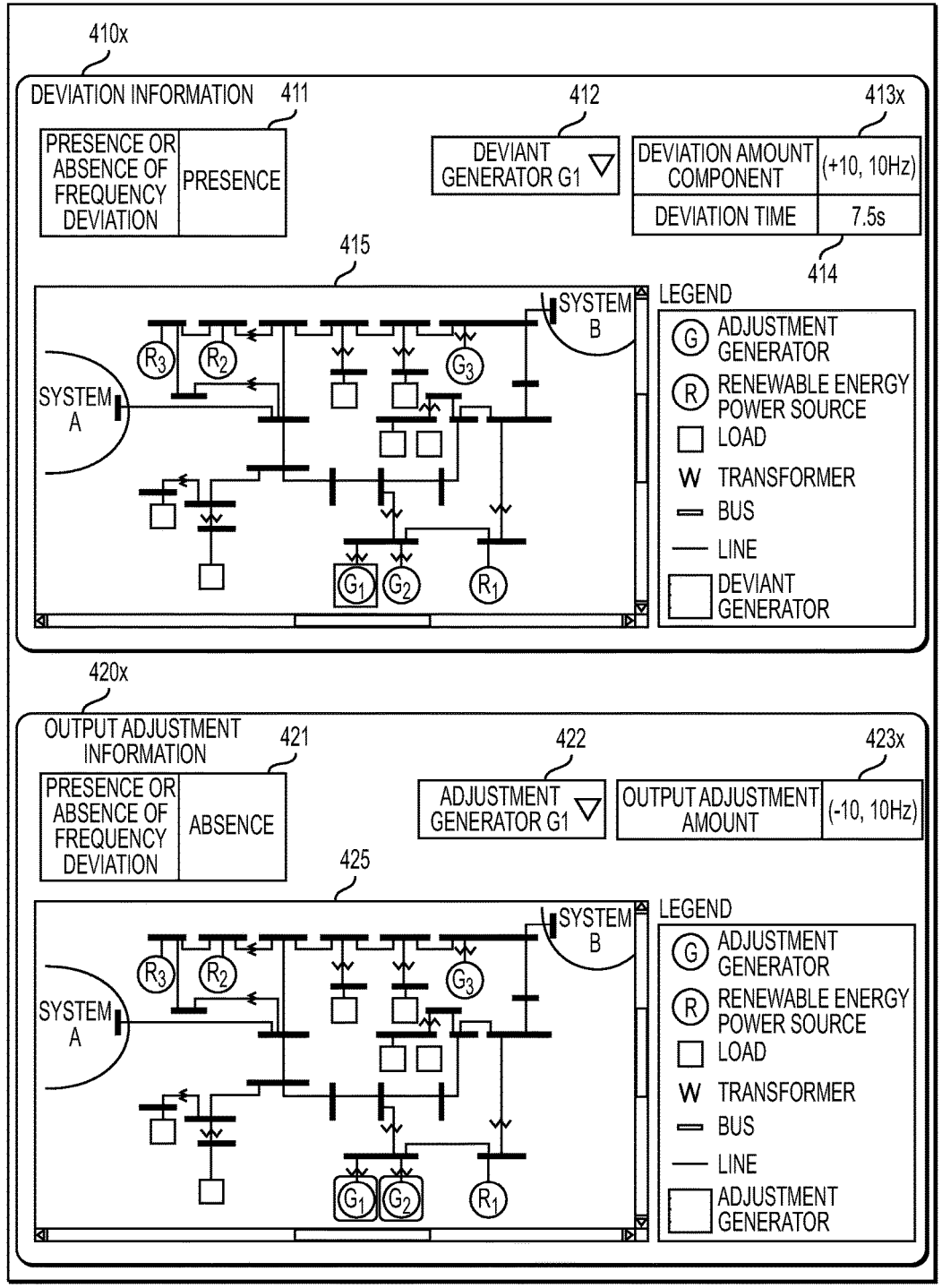
FIG. 25 shows a generator information screen of Example 2.

FIG. 25 shows a generator information screen of Example 2.

The generator information screen includes deviation information 410x and output adjustment information 420x.

The deviation information 410x indicates the state before the output adjustment. The deviation information 410x includes the presence or absence 411 of deviation of the upper and lower limit values of the system frequency, a selection field 412 for receiving selection of the deviant generator, a deviation amount component 413x of the generator, a deviation time 414 of the generator, and a system diagram 415 showing the position of the generator.

The output adjustment information 420x indicates the state after the output adjustment. The output adjustment information 420x indicates, for example, the presence or absence 421 of deviation of the upper and lower limit values of the system frequency, a selection field 422 for receiving selection of an adjustment generator to be subjected to output adjustment, an output adjustment amount 423x of the generator, and a system diagram 425 showing the position of the generator.

Since such calculation results are displayed on the screen of the device 10x for controlling a load frequency or the supervisory control device 200 through the communication network 300, it is possible to know at a glance a generator, a time and a deviation amount component that the generator deviates, and a generator and an extent that the generator is to be adjusted, in the power system 100.

Figure 26:
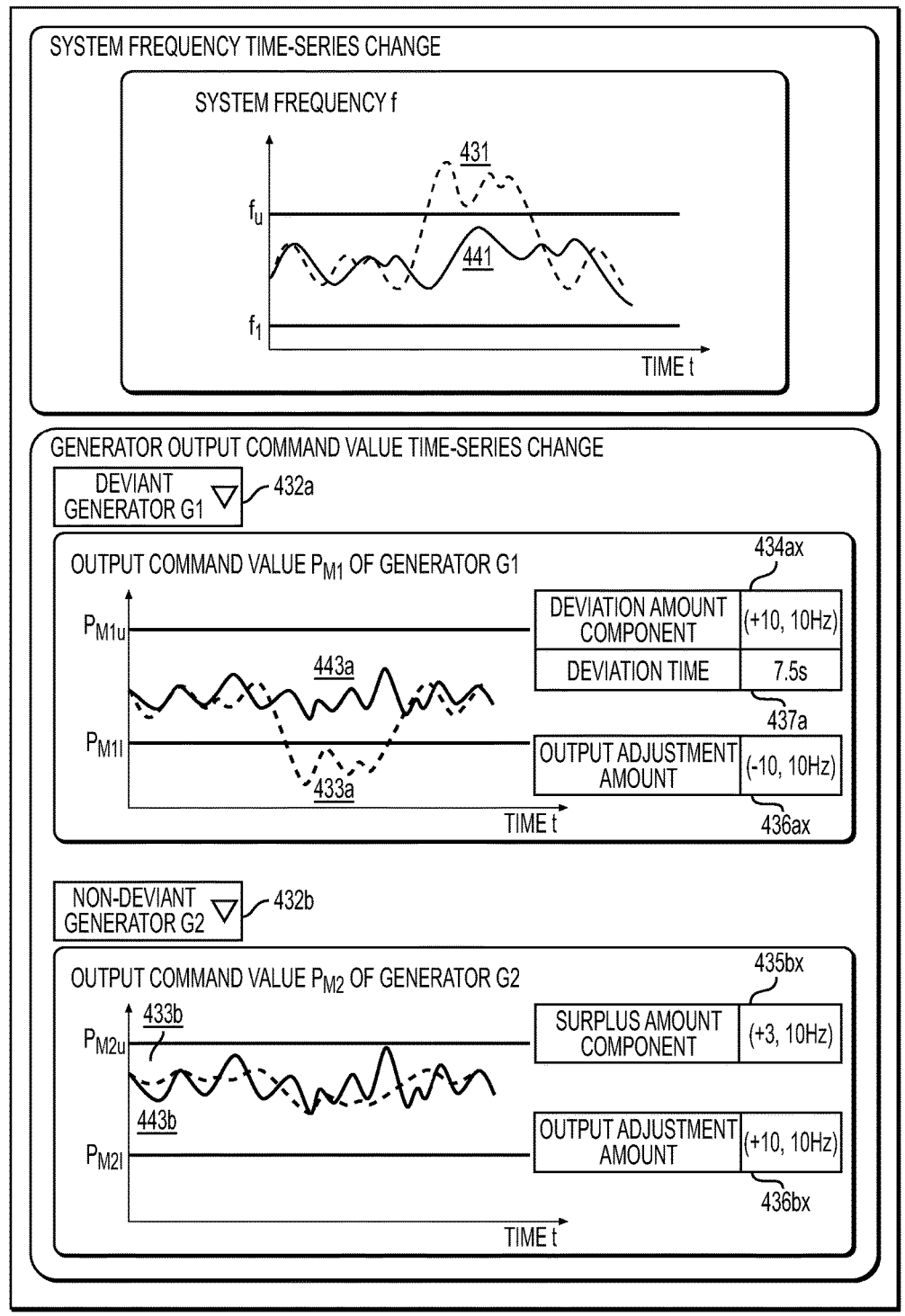
FIG. 26 shows a time-series data screen of Example 2.

FIG. 26 shows a time-series data screen of Example 2.

The time-series data screen shows time-series data before the output adjustment and time-series data after the output adjustment. On the time-series data screen, for example, a system frequency variation time-series data 431 (broken line) before the output adjustment, a system frequency variation time-series data 441 (solid line) after the output adjustment, a selection field 432a for receiving selection of the generator to be controlled, an output command value time-series data 433a (broken line) of the generator before the output adjustment, a deviation amount component 434ax in a case where the generator is a deviant generator, a deviation time 437a of the generator, an output adjustment amount 436ax of the generator, an output command value time-series data 443a (solid line) of the generator after the output adjustment, a selection field 432b for receiving selection of another generator to be controlled, an output command value time-series data 433b (broken line) of the generator before the output adjustment, a surplus amount component 435bx in a case where the generator is a non-deviant generator, an output adjustment amount 436bx of the generator, and an output command value time-series data 443b (solid line) of the generator after the output adjustment are displayed.

Since the calculation results such as the time-series information screen are displayed on the screen of the device 10 for controlling a load frequency or the supervisory control device 200 through the communication network 300, it is possible to know at a glance how the output command value time-series data of the deviant generator and the non-deviant generator in the power system 100 is subjected to output adjustment. Further, in a case where there are a plurality of deviant generators or non-deviant generators, the system operator can select a generator, and check a time-series change calculation result, a deviation amount component calculation result, a surplus amount component calculation result, and an output adjustment target determination result, with respect to the selected generator.

Figure 27:
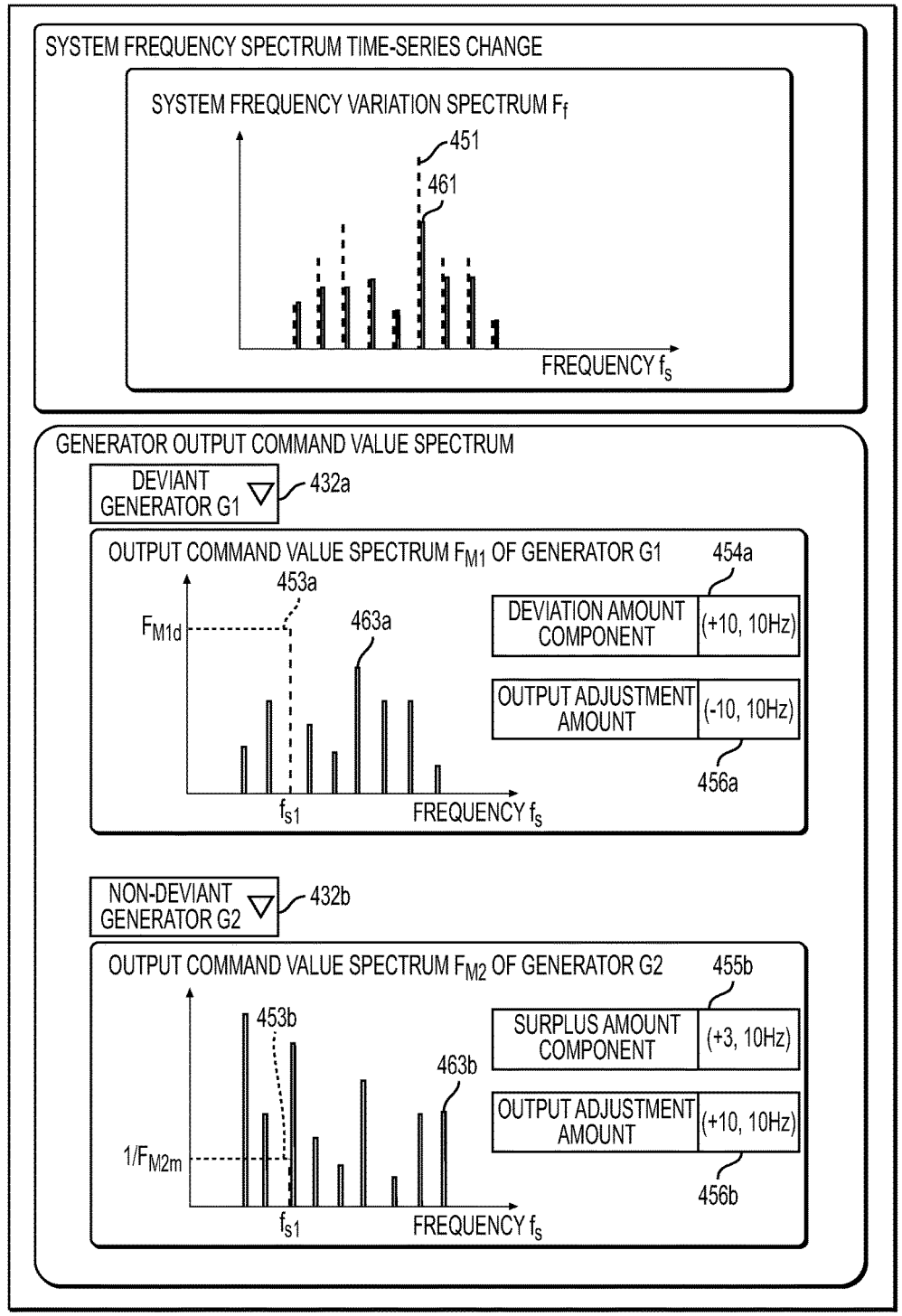
FIG. 27 shows a frequency spectrum screen of Example 2.

FIG. 27 shows a frequency spectrum screen of Example 2.

On the frequency spectrum screen, the frequency spectrum before the output adjustment and the frequency spectrum after the output adjustment are displayed. On the frequency spectrum screen, for example, a system frequency variation spectrum 451 (broken line) before the output adjustment, a system frequency variation spectrum 461 (solid line) after the output adjustment, a selection field 432a for receiving selection of the generator to be controlled, an output command value spectrum 453a (broken line) of the generator before the output adjustment, a deviation amount component 454a in a case where the generator is a deviant generator, an output adjustment amount 456a of the generator, an output command value spectrum 463a (solid line) of the generator after the output adjustment, a selection field 432b for receiving selection of another generator to be controlled, an output command value spectrum 453b (broken line) of the generator before the output adjustment, a surplus amount component 455b in a case where the generator is a non-deviant generator, an output adjustment amount 456b of the generator, and an output command value spectrum 463b (solid line) of the generator after the output adjustment are displayed.

Since the calculation results such as the frequency spectrum screen are displayed on the screen of the device 10 for controlling a load frequency or the supervisory control device 200 through the communication network 300, it is possible to know at a glance how the output command value spectra of the deviant generator and the non-deviant generator are adjusted. Further, in a case where there are a plurality of deviant generators or non-deviant generators, the system operator can select a generator, and check a time-series change calculation result, a deviation amount component calculation result, a surplus amount component calculation result, and an output adjustment target determination result, with respect to the selected generator.

In the processes of the above each example, the order of steps may be exchanged in some cases. For example, S400 and S500, and S1100 and S1200 may be exchanged.

According to each of the examples described above, the device for controlling a load frequency calculates the output adjustment amount of each generator to be controlled, while suppressing the deviation amount component of the deviant generator and maintaining the total output of the plurality of generators to be controlled as adjustment conditions, thereby maintaining the supply-demand balance while preventing deviation of the system frequency. Further, the device for controlling a load frequency stores the output upper and lower limit values, and predicts the output command value time-series data, thereby easily calculating the output adjustment amount. Further, the device for controlling a load frequency divides a plurality of generators to be controlled into a deviant generator and a non-deviant generator, and calculates the deviation amount component of the deviant generator and the surplus amount component of the non-deviant generator, thereby easily calculating the amount of adjustment satisfying the adjustment condition. In addition, the device for controlling a load frequency displays the calculation result on the display device, so that the system operator can know at least one piece of information before the output adjustment or the output adjustment. In addition, the device for controlling a load frequency displays information on the variation of the system frequency on the display device, so that the system operator can know the variation of the system frequency that requires output adjustment. In addition, the device for controlling a load frequency transmits a command based on the output adjustment amount to the generator to be controlled, and adjusts the output of the generator to be controlled, thereby preventing deviation of the predicted system frequency.

Although the embodiments of the present invention have been described above, these are examples for explaining the present invention, and the scope of the present invention is not limited to the above configuration. The present invention can be implemented in various other forms.

REFERENCE SIGNS LIST 10, 10x: DEVICE FOR CONTROLLING LOAD FREQUENCY
11: CPU
12: MEMORY
13: INPUT UNIT
14: COMMUNICATION UNIT
15: DISPLAY UNIT
20, 20x: LOAD FREQUENCY CONTROL AMOUNT CALCULATION UNIT

21: TIME-SERIES CHANGE CALCULATION UNIT
22: DEVIATION AMOUNT COMPONENT CALCULATION UNIT
23: SURPLUS AMOUNT COMPONENT CALCULATION UNIT
24: OUTPUT ADJUSTMENT AMOUNT CALCULATION UNIT
25: OUTPUT ADJUSTMENT TARGET DETERMINATION UNIT
26: OUTPUT ADJUSTMENT COMMAND UNIT
27: DISPLAY UNIT
28: FREQUENCY SPECTRUM CALCULATION UNIT
29: STATE ESTIMATION CALCULATION UNIT
30, 30x: LOAD FREQUENCY CONTROL AMOUNT CALCULATION INPUT DATABASE
40, 40x: LOAD FREQUENCY CONTROL AMOUNT CALCULATION RESULT DATABASE
100: POWER SYSTEM
110A, 110B: GENERATOR
120A, 120B, 120C, 120D: NODE
130A, 130B: TRANSFORMER
140A, 140B, 140C, 140D: BRANCH
150: MEASUREMENT DEVICE
200: SUPERVISORY CONTROL DEVICE
300: COMMUNICATION NETWORK

The invention claimed is:

1. A device for controlling a power system, comprising:
a storage device; and
a central processing unit (CPU) connected to the storage device,
wherein the storage device, with respect to the power system, which includes a renewable energy generator and a plurality of power sources, stores system model data indicating a model of the power system, system data indicating a state of the power system, renewable energy data indicating a past output of the renewable energy generator, and power source data indicating output limitations of each of the plurality of power sources,
wherein the CPU is programmed to
predict a status of individual power sources, of the plurality of power sources, in a future control period, based on the system model data, the system data, and the renewable energy data,
calculate, based on the power source data, and for each of the plurality of power sources, a deviation state indicating a degree to which the time-series data deviates from the output limitations and a surplus state indicating a degree to which the time-series data indicates a surplus with respect to the output limitations,
calculate an amount of adjustment in an output of each of the plurality of power sources, based on the deviation state and the surplus state, under a condition that the deviation state is prevented, and a total power output of the plurality of power sources is maintained; and
output an adjustment command to each of the plurality of power sources, based on the amount of adjustment, to control the output of each of the plurality of power sources such that the total power output of the plurality of power sources is maintained.

2. The device for controlling the power system according to claim 1,
wherein the time-series data also indicates an output command value for each power source of the plurality of power sources, and
wherein the output limitations indicate a range of the output command value of the corresponding power source.

3. The device for controlling the power system according to claim 2,
wherein the CPU determines, for each power source of the plurality of power sources, whether or not the time-series data deviates from the range, with respect to each power source,
wherein the CPU calculates a deviation state of a deviant power source among the plurality of power sources, the deviant power source being a power source of which the time-series data is determined to deviate from the range, and
wherein the CPU calculates a surplus state of a non-deviant power source among the plurality of power sources, the non-deviant power source being a power source of which the time-series data is determined not to deviate from the range.

4. The device for controlling the power system according to claim 3,
wherein the CPU calculates a deviation amount of the time-series data as the deviation state, based on a distance between the boundary value of the range and the time-series data, with respect to the deviant power source, and
wherein the CPU calculates a surplus amount of the time-series data as the surplus state, based on the distance between the boundary value of the range and the time-series data, with respect to the non-deviant power source.

5. The device for controlling the power system according to claim 4,
wherein the CPU calculates the deviation amount having a sign indicating a direction of the deviation with respect to the deviant power source, and calculates an amount of adjustment of the output command value by reversing a sign of the deviation amount, and
wherein the CPU calculates the sum of deviation amounts of all deviant power sources as the deviation, and distributes the deviation to the non-deviant power source according to the surplus amount of the non-deviant power source to calculate an amount of adjustment of an output command value of the non-deviant power source.

6. The device for controlling the power system according to claim 5,
wherein the CPU selects, as the specific value, data at a time at which greatest deviation from the range occurs, from the time-series data, with respect to the deviant power source, and calculates a value obtained by subtracting the boundary value on the deviation side of the range from the specific value, as the deviation amount,
wherein in a case where the deviation is a positive value, the CPU uses a value obtained by subtracting the maximum value of the time-series data from the upper limit value of the range for the non-deviant power source, as the surplus amount, and
wherein in a case where the deviation is a negative value, the CPU uses a value obtained by subtracting the lower limit value of the range from the minimum value of the time-series data for the non-deviant power source, as the surplus amount.

7. The device for controlling the power system according to claim 3,
wherein the CPU calculates a frequency spectrum of the time-series data for each power source, wherein the CPU detects an influence amount which is a maximum value of the frequency component of the frequency spectrum as a deviation state, for the deviant power source, and detects the frequency of the influence amount as an influence frequency, and wherein the CPU detects a frequency component of the influence frequency, from the frequency spectrum, as a target amount, for the non-deviant power source, and calculates a surplus amount that decreases with an increase in the target amount, as the surplus state.

8. The device for controlling the power system according to claim 7, wherein the CPU calculates the amount of adjustment of the frequency component of the influence frequency in the frequency spectrum of the deviant power source, under the condition that the influence amount of the influence frequency of the deviant power source is suppressed, and wherein the CPU calculates the sum of the influence amounts of the influence frequencies of all deviant power sources as the deviation, and distributes the deviation to the non-deviant power source according to the surplus amount of the non-deviant power source to calculate the amount of adjustment of a component of the influence frequency in a frequency spectrum of the non-deviant power source.

9. The device for controlling the power system according to claim 8, wherein the CPU calculates the reciprocal of the target amount as the surplus amount for the non-deviant power source.

10. The device for controlling the power system according to claim 1, wherein the CPU displays at least one of the time-series data, the deviation state, the surplus state, or an amount of adjustment on a display device, for a specific power source among the plurality of power sources.

11. The device for controlling the power system according to claim 10, wherein the storage device stores limitations on a system frequency of the power system, and wherein the CPU predicts time-series data of a variation of the system frequency in the future control period, based on the system model data, the system data, and the renewable energy data, wherein the CPU determines whether a deviation of the time-series data of the variation of the system frequency with respect to the limitations on the system frequency is present, and wherein the CPU displays at least any one of the time-series data of the variation of the system frequency and presence or absence of the deviation of the time-series data of the variation of the system frequency with respect to the limitations on the system frequency, on the display device.

12. A method for controlling a power system comprising:

predicting, with respect to the power system including a renewable energy generator and a plurality of power sources, time-series data of an output of each of the plurality of power sources in a future control period, based on system model data indicating a model of the power system, system data indicating a state of the power system, and renewable energy data indicating a past output of the renewable energy generator;

calculating, based on power source data indicating output limitations of each of the plurality of power sources, for each of the plurality of power sources, a deviation state indicating a degree to which the time-series data deviates from the output limitations and a surplus state indicating a degree to which the time-series data indicates a surplus with respect to the output limitations;

calculating an amount of adjustment in the output of each of the plurality of power sources, based on the deviation state and the surplus state, under a condition that the deviation state is prevented, and a total power output of the plurality of power sources is maintained; and outputting an adjustment command to each of the power sources, based on the amount of adjustment, to control the output of each of the power sources such that the total power output of the plurality of power sources is maintained.

* * * * *